US009214059B2

(12) United States Patent
Crivelli et al.

(10) Patent No.: US 9,214,059 B2
(45) Date of Patent: Dec. 15, 2015

(54) LIGHTING ASSEMBLY FOR REEL SLOT MACHINE

(71) Applicant: IGT, Reno, NV (US)

(72) Inventors: Franco E. Crivelli, Reno, NV (US); Essam Mikhail, Reno, NV (US); Juan C. Hernandez, Sparks, NV (US); Michael T. Garamendi, Reno, NV (US); Anthony J. Frabbiele, Reno, NV (US); Scott H. Jones, Reno, NV (US); John L. Beadell, Sparks, NV (US); Scott T. Gowin, Reno, NV (US)

(73) Assignee: IGT, Reno, NV (US)

( * ) Notice: Subject to any disclaimer, the term of this patent is extended or adjusted under 35 U.S.C. 154(b) by 51 days.

(21) Appl. No.: 14/259,856

(22) Filed: Apr. 23, 2014

(65) Prior Publication Data

US 2015/0105149 A1 Apr. 16, 2015

Related U.S. Application Data

(63) Continuation of application No. 14/258,441, filed on Apr. 22, 2014.

(60) Provisional application No. 61/890,460, filed on Oct. 14, 2013.

(51) Int. Cl.
*G06F 17/00* (2006.01)
*G07F 17/32* (2006.01)

(52) U.S. Cl.
CPC ........ *G07F 17/3213* (2013.01); *G07F 17/3202* (2013.01); *G07F 17/3216* (2013.01)

(58) Field of Classification Search
USPC .......................................... 463/16–25, 30–33
See application file for complete search history.

(56) References Cited

U.S. PATENT DOCUMENTS 3,610,629 A 10/1971 Pecksen
3,910,582 A 10/1975 Richards
4,410,178 A 10/1983 Partridge
5,209,477 A 5/1993 Heidel et al.
5,839,957 A 11/1998 Schneider et al.
5,988,638 A 11/1999 Rodesch et al.
6,102,396 A 8/2000 Liu
6,129,355 A 10/2000 Hahn et al.
7,001,274 B2 2/2006 Baerlocher et al.
7,052,395 B2 5/2006 Glavich et al.

(Continued)

FOREIGN PATENT DOCUMENTS

WO 03090005 A2 10/2003

*Primary Examiner* — Ronald Laneau
(74) *Attorney, Agent, or Firm* — Griffiths & Seaton PLLC

(57) ABSTRACT

A lighting assembly for a reel slot machine includes an interface board and a flexible printed circuit board (PCB). The interface board is substantially planar, electrically couplable to the reel slot machine, and includes a first electrical connection plug and a second electrical connection plug spaced from the first electrical connection plug. The flexible PCB defines a first end and a second end, the first end and second ends of the flexible PCB are electrically coupled to the first electrical connection plug and the second electrical connection plug, respectively. The flexible PCB bows away from each of the first and second ends to define a bowed primary face facing away from the interface board. The flexible PCB further comprises a plurality of light sources coupled to the bowed primary face. During use, the plurality of light sources selectively illuminate to provide lighting to a reel of the reel slot machine.

27 Claims, 22 Drawing Sheets

(56) References Cited

U.S. PATENT DOCUMENTS

| | | | | |
|---|---|---|---|---|
| 7,278,638 | B2 | 10/2007 | Nordman | |
| 7,309,281 | B2 | 12/2007 | Baerlocher et al. | |
| 7,309,282 | B2 | 12/2007 | Baerlocher et al. | |
| 7,624,985 | B2 | 12/2009 | Majima et al. | |
| 8,002,628 | B2 | 8/2011 | Tedsen et al. | |
| 8,192,281 | B2 | 6/2012 | Williams et al. | |
| 8,277,304 | B1 | 10/2012 | Rasmussen et al. | |
| 8,277,308 | B2 | 10/2012 | Baerlocher et al. | |
| 8,298,069 | B2 | 10/2012 | Gowin | |
| 8,348,746 | B2 * | 1/2013 | Wilson et al. | 463/20 |
| 8,360,847 | B2 | 1/2013 | Williams et al. | |
| 8,425,316 | B2 * | 4/2013 | Silva et al. | 463/30 |
| 2002/0180147 | A1 | 12/2002 | Inoue | |
| 2003/0220134 | A1 | 11/2003 | Walker et al. | |
| 2004/0256799 | A1 | 12/2004 | Omomo | |
| 2005/0159210 | A1 | 7/2005 | Satoh | |
| 2008/0004104 | A1 * | 1/2008 | Durham et al. | 463/20 |
| 2008/0227520 | A1 | 9/2008 | Kato et al. | |
| 2009/0149242 | A1 | 6/2009 | Woodard et al. | |
| 2010/0234089 | A1 * | 9/2010 | Saffari et al. | 463/20 |
| 2013/0102376 | A1 | 4/2013 | Paulsen et al. | |
| 2013/0196736 | A1 * | 8/2013 | Thoeni et al. | 463/20 |

* cited by examiner

LIGHTING ASSEMBLY FOR REEL SLOT MACHINE

CROSS-REFERENCE TO RELATED APPLICATION

This application is a continuation application of, and claims priority under 35 U.S.C. §120 to U.S. patent application Ser. No. 14/258,441, filed Apr. 22, 2014, which is a non-provisional application of and claims priority under 35 U.S.C. §119 to U.S. Provisional Patent Application No. 61/890,460, filed Oct. 14, 2013, which are both incorporated herein by reference.

FIELD OF THE INVENTION

The present disclosure relates generally to wager-based gaming machines and, more specifically, to new and improved wager-based gaming machines having mechanical, spinning reels.

BACKGROUND OF THE INVENTION

Wager-based gaming is a multi-billion dollar industry with sustained popularity. Gaming entities, such as casinos appeal to many different audiences and provide one or more of a variety of available different gaming devices. Mechanical reel gaming machines are a staple of the gaming industry. FIG. 1 illustrates one example of a mechanical reel gaming machine 40 including a cabinet 42 housing reel assemblies 44 that are mechanically rotatable within the cabinet 42. Each reel assembly 44 includes a reel strip 46 positioned on a circumference of a cylindrically shaped reel basket 50. Each reel strip 46 has a broad exterior surface depicting a variety of gaming symbols or gaming icons 48. The gaming icons 48 face outwardly and are circumferentially spaced from one another about the reel strip 46. During play, reel assemblies 44 are each independently rotated and stopped to display the gaming icons 48 relative to one or more paylines to reveal predetermined winning or losing combinations of the gaming icons 48. The reel assemblies 44 undergo many spin-stop cycles over a typical lifespan of the gaming machine 40. The useful life of the gaming machine 40 is often extended by "re-skinning" the gaming machine 40 to a different game theme. Such re-skinning may involve reusing each existing reel basket 50 with a new reel strip 46 corresponding to the new game theme.

FIG. 2 illustrates one example of a prior art reel assembly 44 including the reel strip 46 supported by a reel basket 50. The reel basket 50 includes an inner drive ring 52, an outer ring 54 spaced from the inner drive ring 52, and cross links 56 extending from the inner drive ring 52 to the outer ring 54. The reel strip 46 is fairly thin and includes an exterior surface 58, an interior surface 59, and opposing elongated edges 60 (FIG. 5). The interior surface 59 of the reel strip 46 is placed over the cross links 56 and the opposing elongated edges 60 are each secured to a different one of the inner drive ring 52 and the outer ring 54. With reference to FIGS. 3-5, each of the inner drive ring 52 and the outer ring 54 defines a peripheral annual groove 62 facing inwardly toward the other of the inner drive ring 52 and the outer ring 54. Each peripheral annual groove 62 includes protrusions or tabs 64 therein circumferentially spaced from one another along and interrupting the otherwise continuous extension of the peripheral annual groove 62. In this example, the reel strip 46 includes inwardly extending notches 66 spaced along each of the opposing elongated edges 60. Each notch 66 is sized and shaped to snugly receive one of the tabs 64 in a manner registering and maintaining a position of the reel strip 46 relative to the reel basket 50.

While the above-described reel assembly 44 allows for relatively easy replacement of reel strips 46 when the gaming machine 40 is rebranded or otherwise updated, it has multiple drawbacks. For example, the tangential forces from repeated spinning and stopping cycles for a typical reel assembly 44 often results in overstressing of the cross links 56, which may lead to partial or complete failure of the cross links 56 and corresponding reel tilt and/or drive motor overload. In addition, prolonged periods of use of the reel assemblies 44 gradually causes wear and additional play is introduced to the reel assemblies 44 further resulting in undesirable gaps in the appearance of the reel assemblies 44 and distracting wobble when the reel assemblies are rotating.

Furthermore, adhered ends of the reel strip 46 often become loose and/or uncouple from one another potentially leading to release of the reel strip 46 or a portion thereof from a remainder of the reel assembly 44. Reel strips 46 are also relatively easily misaligned with a remainder of the reel assembly 44 where notches 66 do not fully align with tabs 64 and/or where opposing elongated edges 60 of the reel strip 46 release from annular grooves 62 of the inner drive ring 52 and the outer ring 54. These issues with the reels strips 46 are generally quite visible to gamers operating the gaming machine 40 and, thereby, degrade the overall aesthetic appeal of the gaming machine 40 as well as the overall establishment housing the gaming machine 40.

Typically, backlighting is provided to the reel strip 46 to highlight selected ones of the gaming icons 48. However, the cross links 56 may create undesired shadowing across the reel strip 46 when exposed to such lighting. Although this undesirable shadow effect can be minimized by utilizing translucent material for the cross links 56, the shadow effect is often still observable because the translucent material is never 100% transmissive or transparent. Making the cross links 56 thinner may minimize the shadow effect, but also weakens the overall structural integrity of the reel assembly 44.

FIG. 6 illustrates a typical coupling of the reel assembly 44 to a drive motor 70 (FIG. 2). In this example, the drive motor 70 includes a protruding drive shaft 72 coupled with the inner drive ring 52. The inner drive ring 52 includes a center hub 74 with a hollow cylinder 76 protruding outwardly therefrom. An inner diameter of the hollow cylinder 76 is closely sized with an outer diameter of the drive shaft 72 to eliminate gaps which could cause wobble of the rotating reel assembly 44. The drive shaft 72 is positioned through and maintained substantially within the hollow cylinder 76 to couple the drive motor 70 to the inner drive ring 52. The hollow cylinder and the drive shaft 72 are typically keyed to one another to allow a controller to precisely stop the reel assembly 44 from rotating at a predetermined stationary position in accordance with a specific game outcome. The reel assembly 44 is secured to the drive shaft 42 by a slidable e-clip 78 that is slid onto and thereby secured to a portion of the drive shaft 72 extending beyond an end of the hollow cylinder 76.

The above-described coupling requires the slidable e-clip 78 for assembly as well as tools for inserting and/or removing the separate e-clip 78. In instances where the proper tools are not readily available, the slidable e-clip 78 may not be properly slid onto the drive shaft 72 resulting in the slidable e-clip 78 disengaging the drive shaft 72. As a result, the reel assembly 44 may undesirably tilt relative to the drive shaft 72 or even entirely dislodge from the drive shaft 72. Additionally, the e-clip 78 is relatively small in size contributing to the likelihood that it will be inadvertently lost during routine maintenance of the reel assembly 44.

As previously mentioned, the reel assembly 44 typically includes lighting behind the reel strip 46 providing rear illumination to gaming icons 48 of reel strip 46 facing a front of gaming machine 40 to increase the visual appeal of gaming machine 40 as illustrated in FIG. 7. Such lighting is typically provided in the form of a plurality of light-emitting diodes (LEDs; not shown) mounted on a series of separate printed circuit board (PCB) members generally indicated at 82 supported by one light bracket 80. The light bracket 80 directs light from the LEDs toward a front of the gaming machine 40 (FIG. 1), and the LEDs typically are arranged to light up individual ones of the gaming icons 48 when the reel assembly 44 remains stationary and/or rotates within the gaming machine 40. The large number of wires and electrical connections that need to be made between the separate PCB boards increases the cost and complexity of installation and servicing.

SUMMARY OF THE INVENTION

To address reel assembly life cycle degradation and assembly issues seen in the prior art, in one embodiment, by way of example only, a reel assembly is provided for use in a mechanical gaming device including a substantially continuous, and in one example, integral support substrate extending between an inner drive ring and an outer ring of the reel assembly. The substantially continuous support substrate provides for robust coupling of the inner drive ring to the outer ring that is more suitable for use over the many start and stop cycles of a gaming machine. The substantially continuous support substrate also provides for a more reliable placement and maintenance of gaming icons on the reel assembly. In one example, the support substrate is substantially transparent such that the support substrate casts little or no shadows when the reel strips are backlit for additional aesthetic appeal. In one example, the continuous support substrate also allows for registration via mechanical indexing without requiring the reel assembly to include additional dedicated registration structure.

To address the complicated light structures seen in the prior art and a desire to both illuminate reel assemblies and provide side lighting between reel assemblies, in one embodiment, by way of example only, a light assembly is provided for use with a reel assembly that makes use of a printed circuit board as light support, which reduces the need for brackets and/or the number of electrical connections that must be made during installation of the light assemblies. In one example, a single flexible printed circuit board supports lights for a reel assembly and an adjacent sidelight. In one example, a single light is directed and dispersed to illuminated a designated area of the reel assembly increasing options for differentiating illumination of a reel assembly for different occurrences during game play and/or during rebranding or overhaul of a gaming machine for aesthetically differentiated games.

One embodiment of the present invention relates to a lighting assembly for a reel slot machine including an interface board and a flexible printed circuit board. The interface board is substantially planar, electrically couplable to the reel slot machine, and includes a first electrical connection plug and a second electrical connection plug spaced from the first electrical connection plug. The flexible printed circuit board defines a first end and a second end opposite the first end, the first end of the flexible printed circuit board is electrically coupled to the first electrical connection plug, and the second end of the flexible printed circuit board is electrically coupled to the second electrical connection plug. The flexible printed circuit board bows away from each of the first end and the second end to define a bowed primary face facing away from the interface board. The flexible printed circuit board further comprises a plurality of light sources coupled to the bowed primary face, and during use, the plurality of light sources selectively illuminate to provide lighting to a reel of the reel slot machine. Other apparatus, assemblies, and associated methods are also disclosed.

The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which like reference numerals denote like elements, and in which.

DETAILED DESCRIPTION

The following detailed description of the invention merely provides exemplary embodiments and is not intended to limit the invention or the application and uses of the invention. Furthermore, there is no intention to be bound by any theory presented in the preceding background of the invention or the following detailed description of the invention.

Embodiments of the present invention are described below provide improved reel assemblies and associated lighting assemblies. The reel assemblies generally provide continuous support between an inner drive ring and an outer ring of a reel assembly providing for a more stable coupling between the inner drive ring and the outer ring, but also providing a more continuous support for an associated reel strip, providing little to no shadowing upon backlighting thereof, and being suitable for longer periods of use with lessened degradation of the reel assembly or its coupling to a gaming machine. Light assemblies according to the present invention generally comprise fewer components than prior art counterparts, allow for easier and more precise assembly, further enhance aesthetics of the overall gaming machine, and/or are segmented to allow for even yet segmented illumination of an associated reel strip. All embodiments of the present invention described herein are example of implementations of the current invention and should not be taken in a limiting sense.

Figure 1:
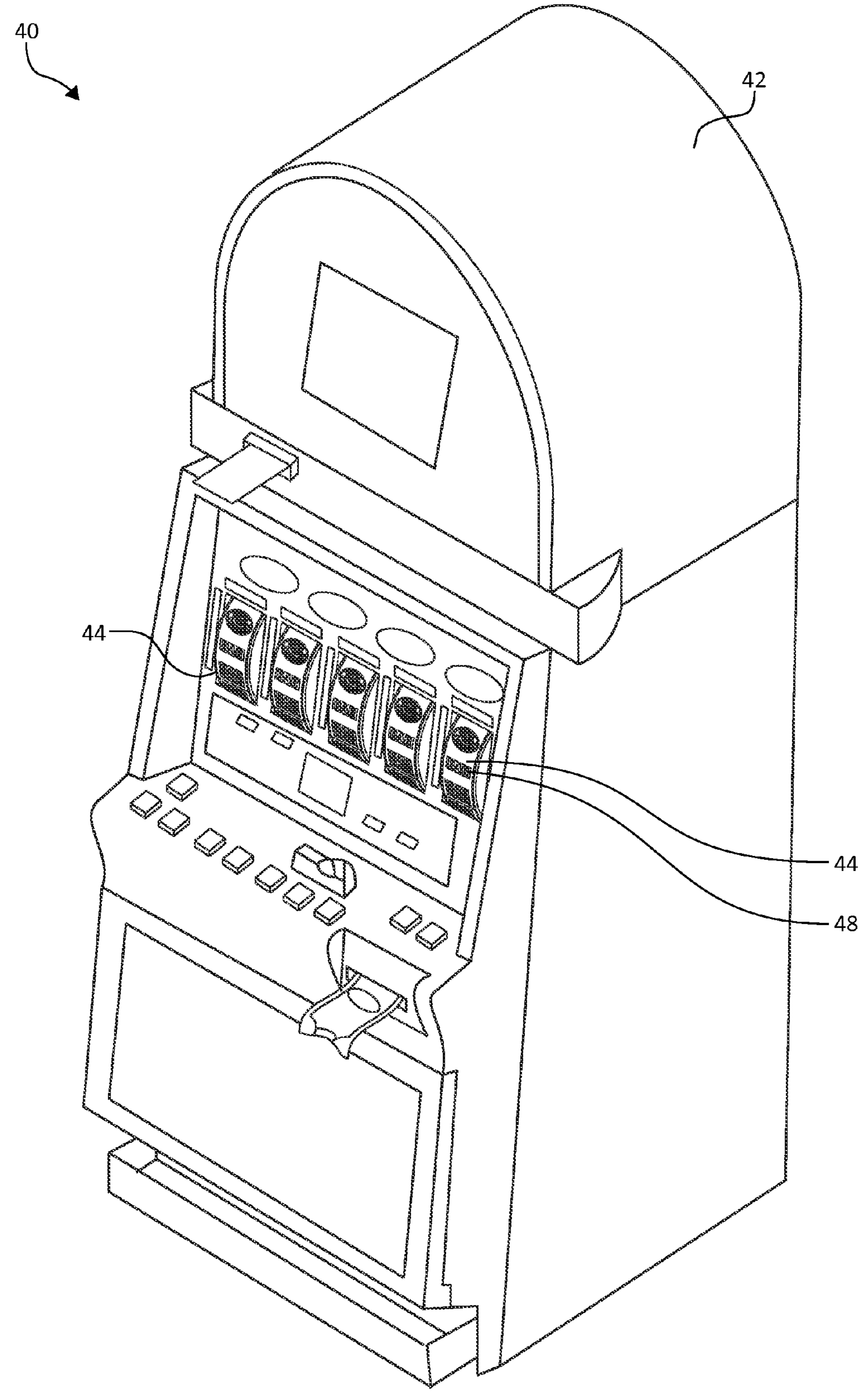
FIG. 1 is a perspective view illustration of a prior art mechanical reel gaming assembly.
Figure 2:
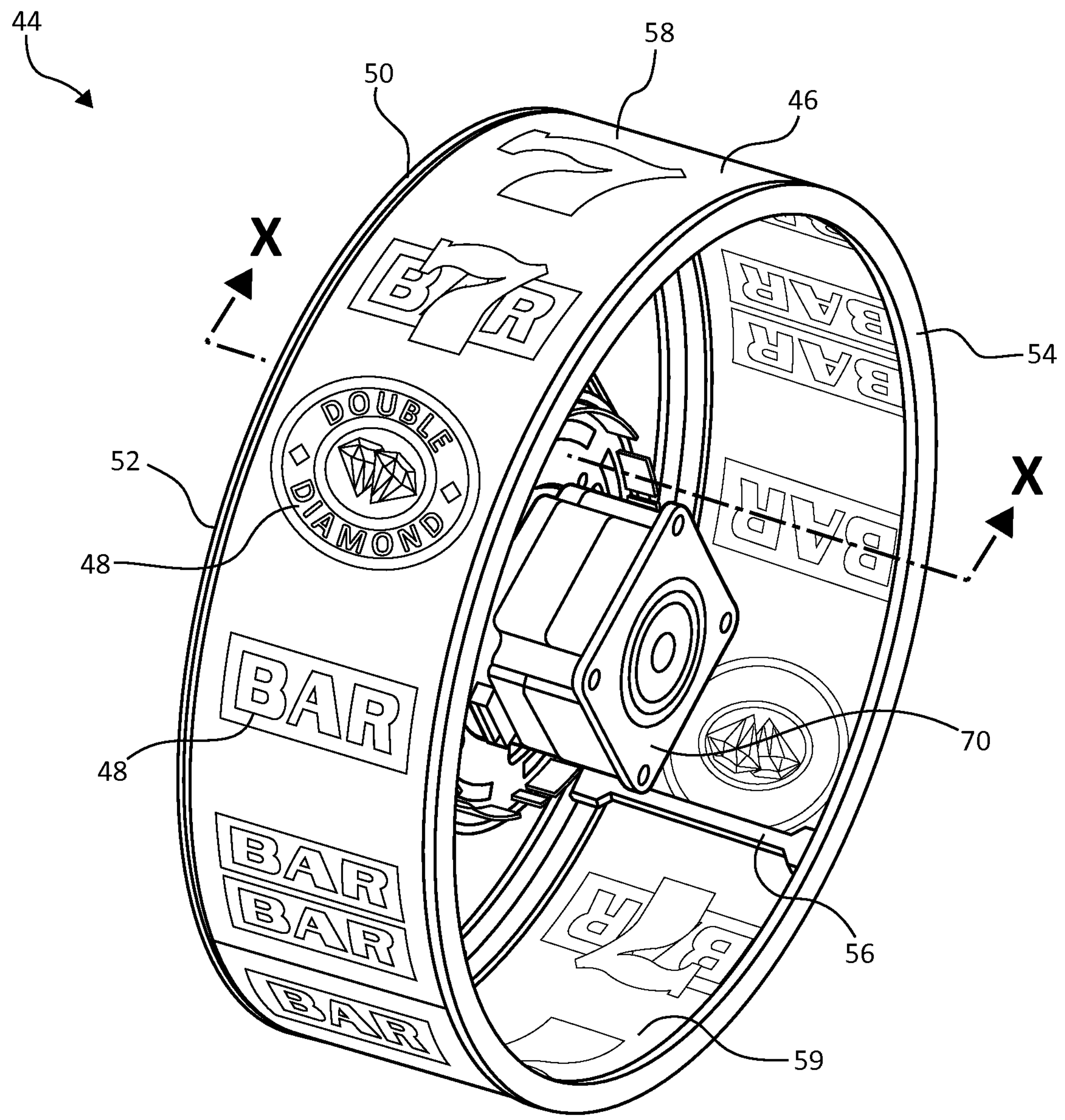
FIG. 2 is a perspective view illustration of a prior art reel assembly.
Figure 3:
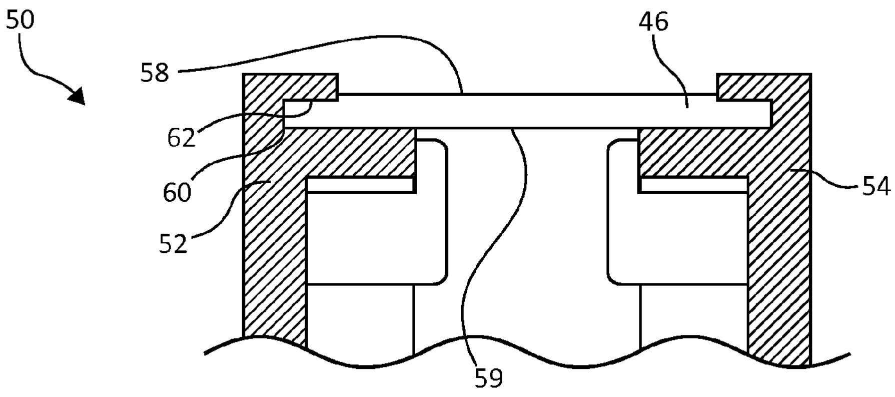
FIG. 3 is a partial cross-sectional view illustration taken about the line X-X in FIG. 2.
Figure 4:
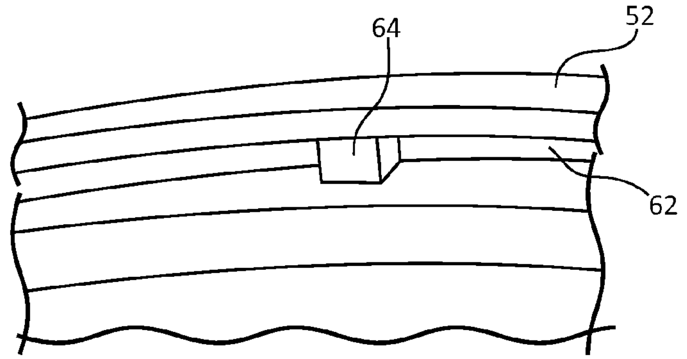
FIG. 4 is a perspective, detailed view illustration of a portion of the reel assembly of FIG. 2.
Figure 5:
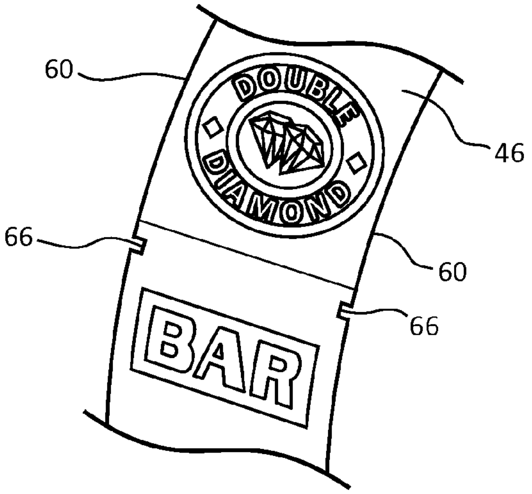
FIG. 5 is a perspective view illustration of a reel strip of the reel assembly of FIG. 2.
Figure 6:
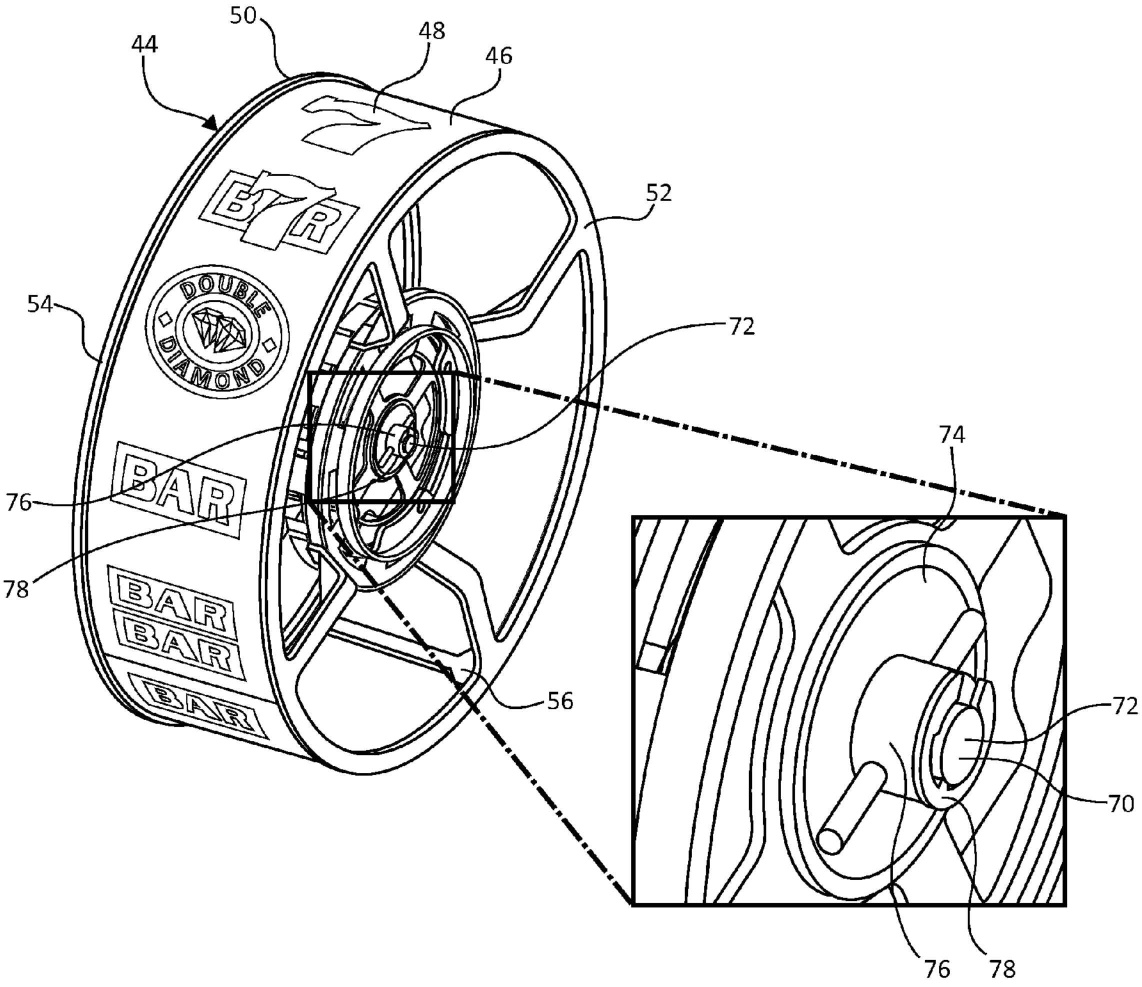
FIG. 6 is a perspective view illustration with inset detail of the reel assembly of FIG. 2 coupled to a drive motor.
Figure 7:
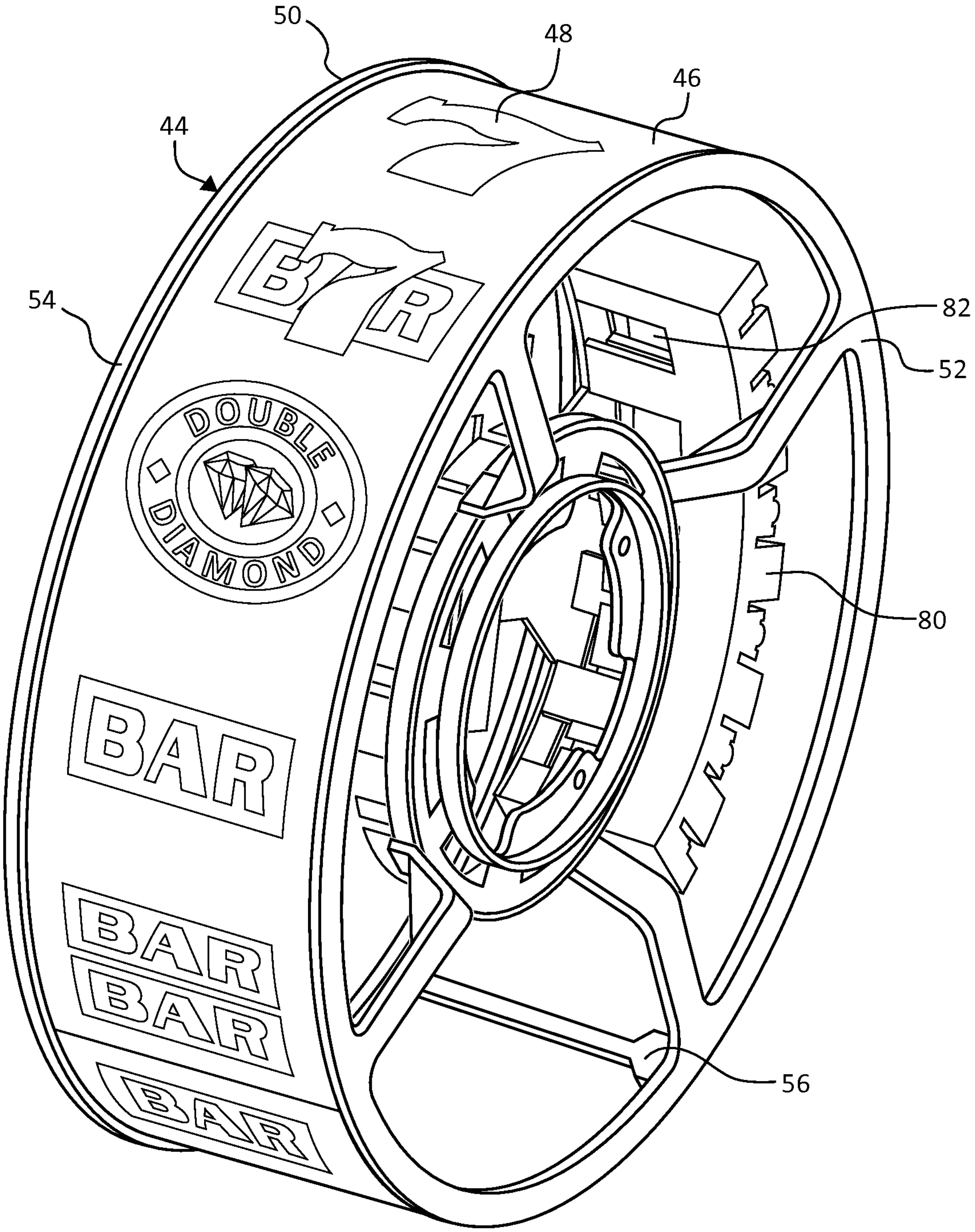
FIG. 7 is a perspective view illustration of a reel assembly with a prior art light bracket.
Figure 8:
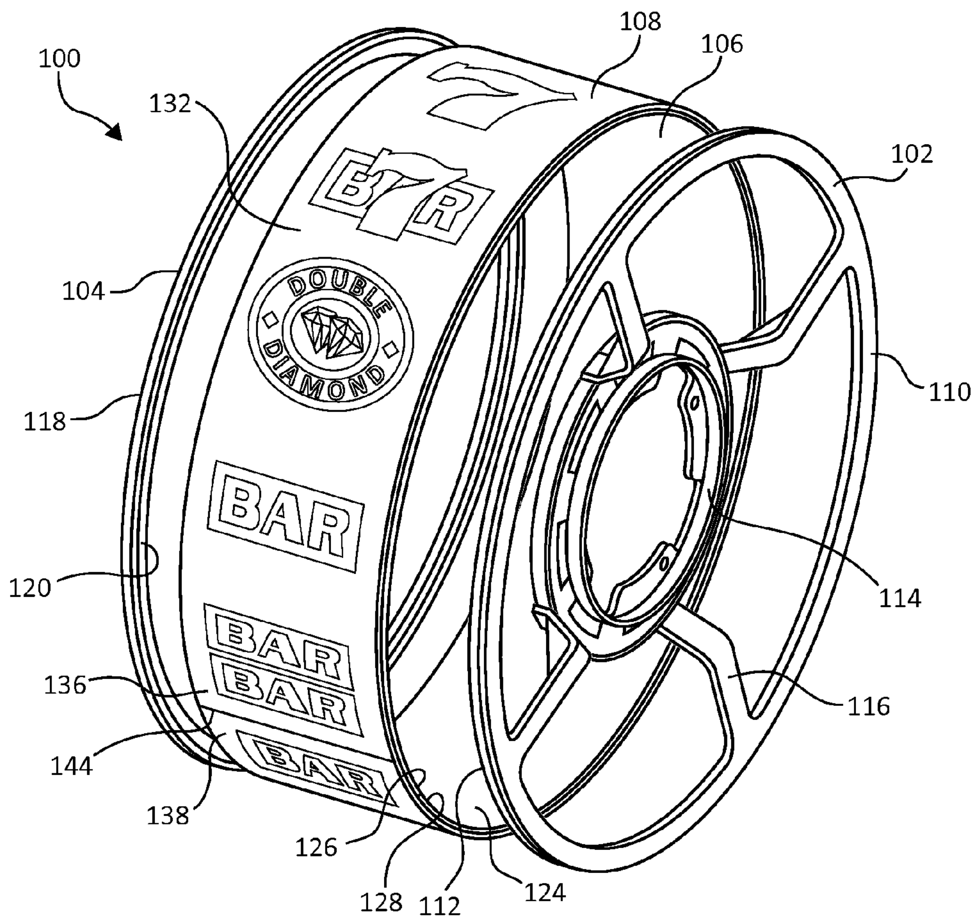
FIG. 8 is an exploded, perspective view illustration of a reel assembly, according to one embodiment of the present invention.

Turning to the figures, FIG. 8 illustrates one example of a reel assembly 100 according to the new invention. The reel assembly 100 includes an inner drive ring 102, an outer ring 104, a support substrate 106, and a reel strip 108. The inner drive ring 102 is coaxially positioned relative to the outer ring 104 and is spaced from the outer ring 104 by the support substrate 106. In one example, the support substrate 106 is coupled to each of and independently extends between the inner drive ring 102 and the outer ring 104 in a substantially unsupported manner. As a result, rotation imparted to the inner drive ring 102 causes rotation of the outer ring 104 and the support substrate 106.

More specifically, in one example, the inner drive ring 102 includes an annular rim 110, a coupling flange 112, a hub 114, and spokes 116. In one example, the coupling flange 112 is substantially annular and extends inwardly from the annular rim 110 at a position radially inset from the annular rim 110. The hub 114 is concentrically positioned relative to and spaced radially inwardly from the annular rim 110. The spokes 116 extend from the hub 114 to the annular rim 110 circumferentially spaced from one another and maintaining the hub 114 positioned relative to the annular rim 110. In one embodiment, the inner drive ring 102 is formed as a single piece of material, such as, injection molded plastic or other suitable material.

The outer ring 104, according to one example, includes an annular rim 118 and a coupling flange 120. In one example, the coupling flange 112 is substantially annular and extends inwardly toward inner drive ring 102 from the annular rim 118 at a position radially inset from the annular rim 118. In an embodiment, the annular rims 110 and 118 are substantially similar in diameter and are coaxially positioned relative to one another.

In one embodiment, the support substrate 106 is substantially planar, elongated, and substantially continuous such that the support substrate 106 defines an exterior surface 122 and an interior surface 124 opposite the exterior surface 122. Each of the exterior surface 122 and the interior surface 124 extend between a first end 126 of the support substrate 106 and a second end 128 of the support substrate 106 opposite the first end 126. The support substrate 106 defines opposing elongated edges 130 extending between the first end 126 and the second end 128 bordering each of the exterior surface 122 and the interior surface 124. The support substrate 106 is formed of a suitable bendable yet substantially rigid material such as plastic, etc. and, in one example, is transparent or translucent.

The reel strip 108 is substantially planar and, in one example is substantially identical in size and shape to the support substrate 106. Reel strip 108 defines an exterior surface 132 and an interior surface 134 opposite the exterior surface 132. Each of the interior surface 134 and the exterior surface 132 are defined between a first end 136 of the reel strip 108, the second end 138 of the reel strip 108 opposite the first end 136, and opposing elongated edges 140 of the reel strip 108 extending between the first end 136 and the second end 138. The reel strip 108 further includes gaming icons 142 or other suitable game supporting indicia thereon, for instance, spaced around the reel strip 108 in a circumferential manner, such that the gaming icons 142 are visible when viewing exterior surface 132. In one example, the gaming icons 142 are silkscreen printed in a reverse orientation to the interior surface 134 and viewable through reel strip 108, which is formed of a translucent or transparent material. In one example the gaming icons 142 are silkscreen printed or otherwise applied to the exterior surface 132, which is formed of a translucent or transparent material.

Figure 9:
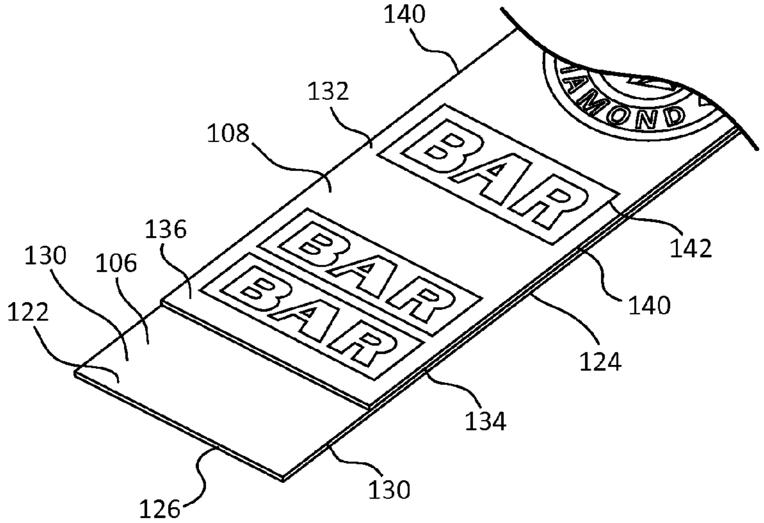
FIG. 9 is a partial perspective view of an end of a reel strip from the reel assembly of FIG. 8, according to one embodiment of the present invention.

During assembly, the interior surface 134 of the reel strip 108 is placed adjacent the exterior surface 122 of the support substrate 106 as illustrated, for example, in FIG. 9, such that the opposing elongated edges 130 of the support substrate 106 are positioned adjacent the opposing elongated edges 140 of the reel strip 108. In one embodiment, an optically clear adhesive is used between the interior surface 134 and the exterior surface 122 to secure the reel strip 108 to the support substrate 106. Other suitable means for fastening the reel strip 108 to the support substrate 106 may also be used such as lamination, etc. As illustrated, the reel strip 108 is longitudinally offset from the support substrate 106 such that the first end 136 of the reel strip 108 is positioned near, but inset from first end 126 of the support substrate 106 leaving a portion of exterior surface 122 of the support substrate 106 exposed between the first end 136 of the reel strip 108 and the first end 126 of the support substrate 106. Since, in one example, the reel strip 108 has a length substantially identical to a length of the support substrate 106, an opposing end portion (not shown) of the interior surface 134 of the reel strip 108 is similarly left exposed opposite the portion of the exterior surface 122 of the support substrate 106 that is exposed.

After the reel strip 108 is secured to the support substrate 106, the resultant combination is manipulated to bend the combination to form a hollow cylinder or tube. More particularly, the support substrate 106 is bent until the first end 126 of the support substrate 106 is placed to abut the second end 128 of the support substrate 106. In so bending the support substrate 106, the portion of the interior surface 134 of the reel strip 108 adjacent the second end 138 of the reel strip 108 is placed over the exposed portion of the exterior surface 122 of the support substrate 10 such that first end 136 and second end 138 of the reel strip 108 abut one another forming a boundary line 144. In one embodiment, the support substrate 106 is made of a suitable polypropylene or other suitable material that is sufficiently flexible to decrease the occurrence or structural impact of any binding of either the reel strip 108 or the support substrate 106 upon bending. The previously exposed exterior surface 122 of the support substrate 106 is coupled to the interior surface 134 of the reel strip 108, for example, in the same manner as the reel strip 108 was initial secured to the support substrate 106 as described above. In one embodiment, the boundary line 144 is substantially unnoticeable to a typical player of a gaming machine (e.g., a reel slot machine) using the reel assembly 100. As a result, the abutment of the first end 126 to the second end 128 of the support substrate 106 is offset from the boundary line 144 between the first end 136 and the second end 138 of the reel strip 108. The offset makes such abutments less visually perceivable by a gamer interacting with the reel assembly 100 and strengthens the resultant reel assembly 100.

Figure 10:
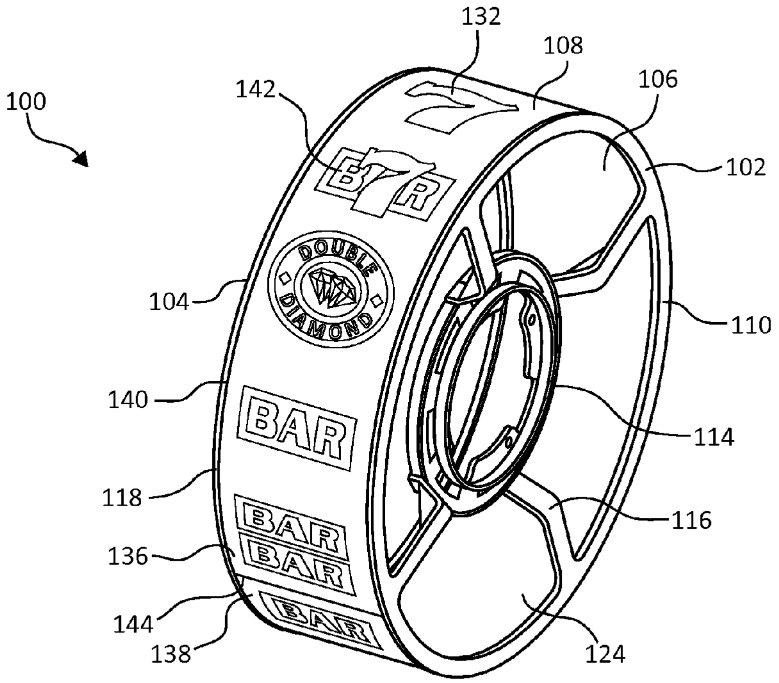
FIG. 10 is a perspective view illustration of a reel assembly, according to one embodiment of the present invention.

Following formation of the support substrate 106 and the reel strip 108 into a hollow cylinder, the combination is coupled with the inner drive ring 102 and the outer ring 104. For example, referring to FIGS. 8 and 10, the interior surface 124 of the support substrate 106 adjacent each of the opposing elongated edges 130 is adhered, ultrasonically welded, chemically bonded, electrostatically coupled, mechanically coupled, or otherwise suitably coupled to a different one of the flanges 112 and 120 of the inner drive ring 102 and the outer ring 104, respectively. Coupling of the support substrate 106 to the inner drive ring 102 and the outer ring 104 is sufficient to prevent rotation of the support substrate 106 relative to either one of the inner drive ring 102 and the outer ring 104. The support substrate 106 fully maintains the inner drive ring 102 and the outer ring 104 spaced from one another and extends therebetween without additional support members extending between the inner drive ring 102 and the outer ring 104.

In one embodiment, the position of the reel strip 108 and the gaming icons 142 thereon are mechanically indexed or registered relative to the inner drive ring 102 by placing either the boundary line 144 and/or the abutment between the first end 126 and the second end 128 of the support substrate 106 in a predetermined circumferential position relative to the inner drive ring 102. As such, the reel strip 108 is registered with the inner drive ring 102 without the use of dedicated structure (e.g., tabs and notches) of the inner drive ring 102 or the reel strip 108. When the inner drive ring 102 and the reel strip 108 are properly registered, manipulation of the inner drive ring 102 within the gaming machine will position different known ones of the gaming icons 142 to face directly forwardly in the gaming machine when the inner drive ring 102 is rotated to different ones of a plurality of designated positions. Other methods of registration may be used in addition to or as an alternative to positioning of either the boundary line 144 and/or the abutment between the first end 126 and the second end 128 of the support substrate 106 in a predetermined circumferential position relative to the inner drive ring 102.

The annular rims 110 and 118 of the inner drive ring 102 and the outer ring 104 each cover opposing ones of the elongated edges 130 and 140 of the support substrate 106 and the reel strip 108 creating a generally neat and aesthetically pleasing appearance to the reel assembly 100. The reel assembly 100 is thereby formed such that the inner drive ring 102 and the outer ring 104 are coupled to one another solely via the support substrate 106 with the support substrate 106 extending between the inner drive ring 102 and the outer ring 104 substantially continuously and, in one example, substantially or entirely unsupported.

Figure 11:
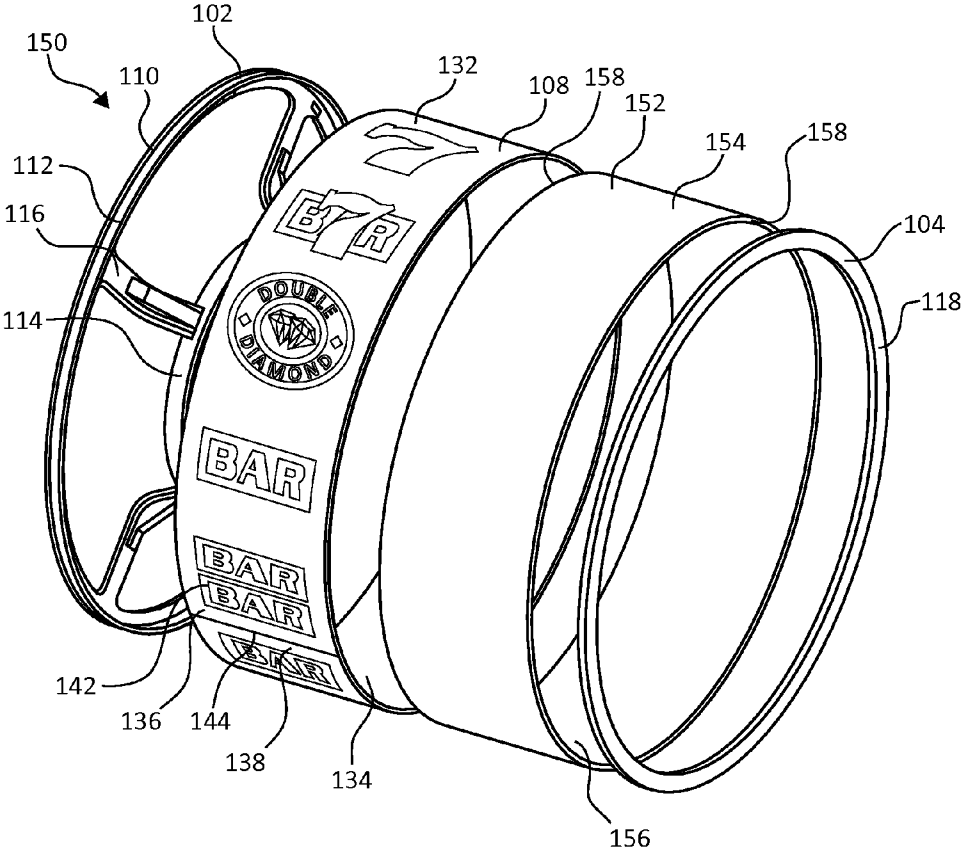
FIG. 11 is an exploded, perspective view illustration of a reel assembly, according to one embodiment of the present invention.

FIG. 11 illustrates an exploded view of another embodiment of a reel assembly 150 according to the present invention. Like the reel assembly 100, the reel assembly 150 includes the inner drive ring 102, the outer ring 104, and the reel strip 108. Instead of the support substrate 106 (FIGS. 8-10), the reel assembly 150 includes a support substrate 152 in the form of a single piece, continuous, hollow cylinder defining an exterior surface 154, an interior surface 156 opposite the exterior surface 154, and opposing circular edges 158 each extending between the interior surface 156 and the exterior surface 154. In one example, the support substrate 152 is transparent or translucent.

During assembly, in one example, the reel strip 108 is wrapped around and secured to the exterior surface 154 of the support substrate 152 in a manner aligning the opposing elongated edges 130 of the reel strip 108 with the opposing circular edges 158 of the support substrate 152. The support substrate 152 is subsequently registered with the inner drive ring 102 using mechanical indexing based on the location of the boundary line 144 of the reel strip 108, for example, and a position of the inner drive ring 102 achieved via interaction with the hub 114. Once properly positioned, the reel strip 108 is coupled to the inner drive ring 102 and the outer ring 104, for example, via an adhesive, ultrasonically welding, chemical bond, electrostatic coupling, mechanical coupling, or other suitable coupling. In another example, the support substrate 152 is coupled with the inner drive ring 102 and the outer ring 104 first, and the reel strip 108 is coupled with the exterior surface 154 thereafter. The support substrate 152 independently maintains the inner drive ring 102 and the outer ring 104 coupled to and consistently spaced from one another generally without an additional support structure extending between the inner drive ring 102 and the outer ring 104. When the reel strip 108 is coupled with the support substrate 152, which is already coupled with the inner drive ring 102, the reel strip 108 is positioned in a known position relative to a designated one of the stop positions of the inner drive ring 102 such that each gaming icon 142 will face directly forwardly in a gaming machine when the inner drive ring 102 is in one of the plurality of predetermined stop positions.

Figure 12:
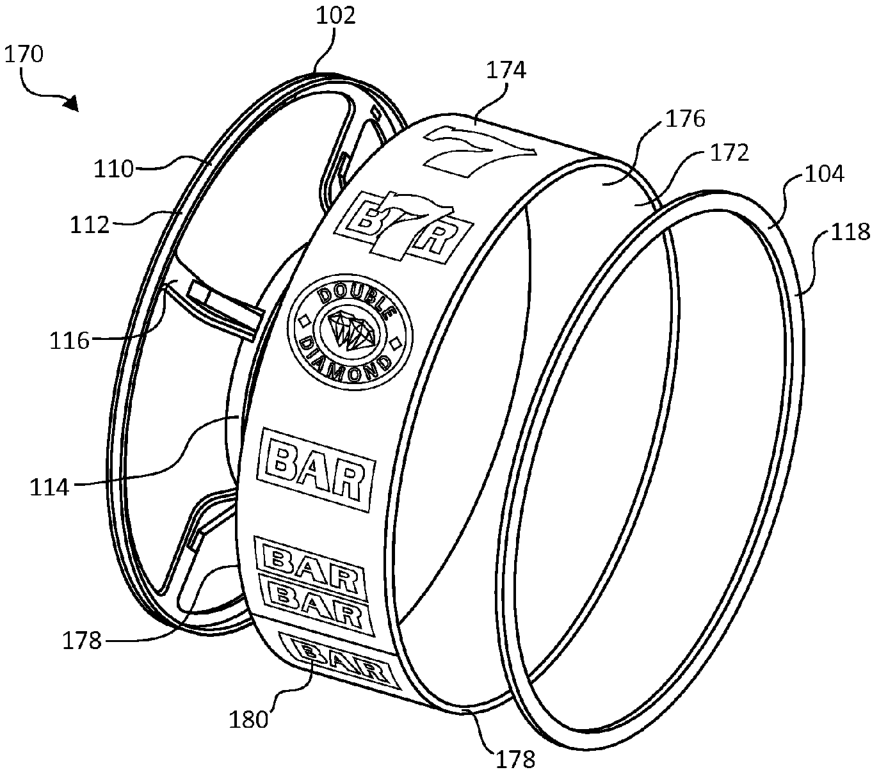
FIG. 12 is an exploded, perspective view illustration of a reel assembly, according to one embodiment of the present invention.

FIG. 12 illustrates another embodiment of a reel assembly 170. The reel assembly 170, like reel assemblies 100 and 150, includes inner drive ring 102 and outer ring 104. The reel assembly 170 additionally includes a support substrate 172 in the form of a single piece, continuous, hollow cylinder defining an exterior surface 174, an interior surface 176 opposite the exterior surface 174, and opposing circular edges 178 each extending between the interior surface 176 and the exterior surface 174. In one example, the support surface 172 is transparent or translucent (i.e., substantially transparent), and gaming icons 180 are directly silkscreen printed or otherwise printed to the exterior surface 174 of the support substrate 172 in predetermined positions that will result in a different one of the gaming icons 180 being directly forward facing in a gaming machine when the inner drive ring 102 is positioned in each one of the plurality of predetermined stop positions. Following printing the support substrate 172, the support substrate 172 is adhered, ultrasonically welded, chemically bonded, electrostatically coupled, mechanically coupled, or otherwise suitably coupled to each of the inner drive ring 102 and the outer ring 104, for instance via corresponding flanges 112 and 120. In this manner, the support substrate 172 independently extends between and couples together the inner drive ring 102 and the outer ring 104 in a manner unsupported by other structure extending between the inner drive ring 102 and the outer ring 104. In another example, the gaming icons 180 are printed to the support substrate 172 after the support substrate 172 is coupled with the inner drive ring 102. In this manner the location of the gaming icons 180 is registered based on the corresponding rotational manipulation of the reel assembly 170 via the inner drive ring 102 during printing.

While described as directly printing gaming icons 180 to a cylindrical form of the support substrate 172, in another embodiment, similar gaming icons 180 can be printed to a planar substrate similar to support substrate 106 of FIG. 8 that is later manipulated to form a cylinder extending between the inner drive ring 102 and the outer ring 104. In yet another embodiment, a planar substrate similar to support substrate 106 is manipulated into a hollow cylinder or tube and coupled to the inner drive ring 102 and the outer ring 104 prior to printing any gaming icons 180 to the support substrate 172.

Figure 13:
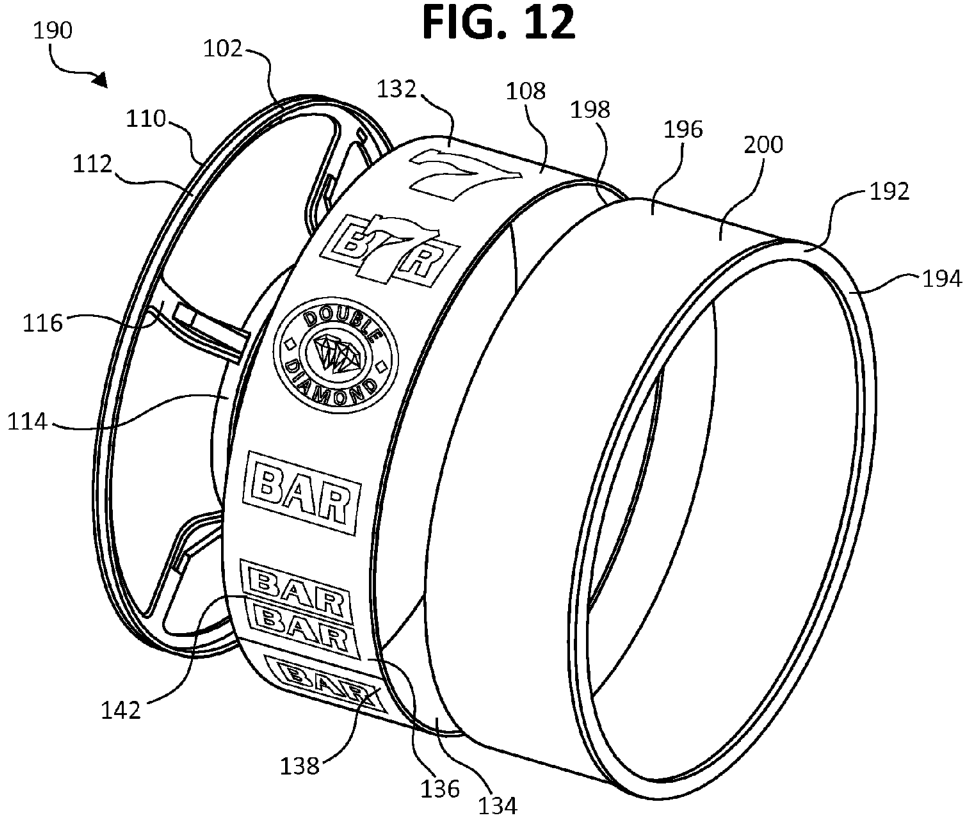
FIG. 13 is an exploded, perspective view illustration of a reel assembly, according to one embodiment of the present invention.

FIG. 13 illustrates one embodiment of a reel assembly 190. The reel assembly 190, like reel assemblies 100 and 150, includes the inner drive ring 102 and the reel strip 108, in one example. The reel assembly 190 additionally includes an outer ring assembly 192 comprising an annular rim 194 and a support substrate 196. The annular rim 194 is similar to the annular rim 118 of FIG. 8, and support substrate 196 is largely similar to the support substrate 152. However, the annular rim 194 and the support substrate 196 are formed as a single piece member formed, for example, via injection molded, extrusion, or other known manufacturing method(s). In one embodiment, the outer ring assembly 192 is formed as a single piece of a transparent or translucent material. In one example, a single injection molding process is used to form the outer ring assembly 192, but is completed such that each of the support substrate 196 and the annular rim 194 are formed of differing materials.

The support substrate 196 defines a free edge 198 opposite the annular rim 194. The free edge 198 is substantially continuous and is adhered, ultrasonically welded, chemically bonded, electrostatically coupled, mechanically coupled, or otherwise suitably coupled to the inner drive ring 102, for example, the flange 112 of the inner drive ring 102. In this manner, the support substrate 196 independently extends between, maintains the spacing of, and couples the inner drive ring 102 to the annular rim 194 without additional supports extending between the inner drive ring 102 and the annular rim 194. In one example, the support substrate 196 defines an exterior surface 200, which is coupled to the reel strip 108 via an optically clear adhesive or other chemical, electrostatic, or mechanical coupling agent. The reel strip 108 may be coupled to the exterior surface 200 of the support substrate 196 either before or after the free edge 198 of the support substrate 196 is coupled with the inner drive ring 102. In one embodiment, the support substrate 196 is printed with the gaming icons 124 and the reel strip 108 is eliminated similar to the description of the support substrate 172 of reel assembly 170 (FIG. 12).

Figure 14:
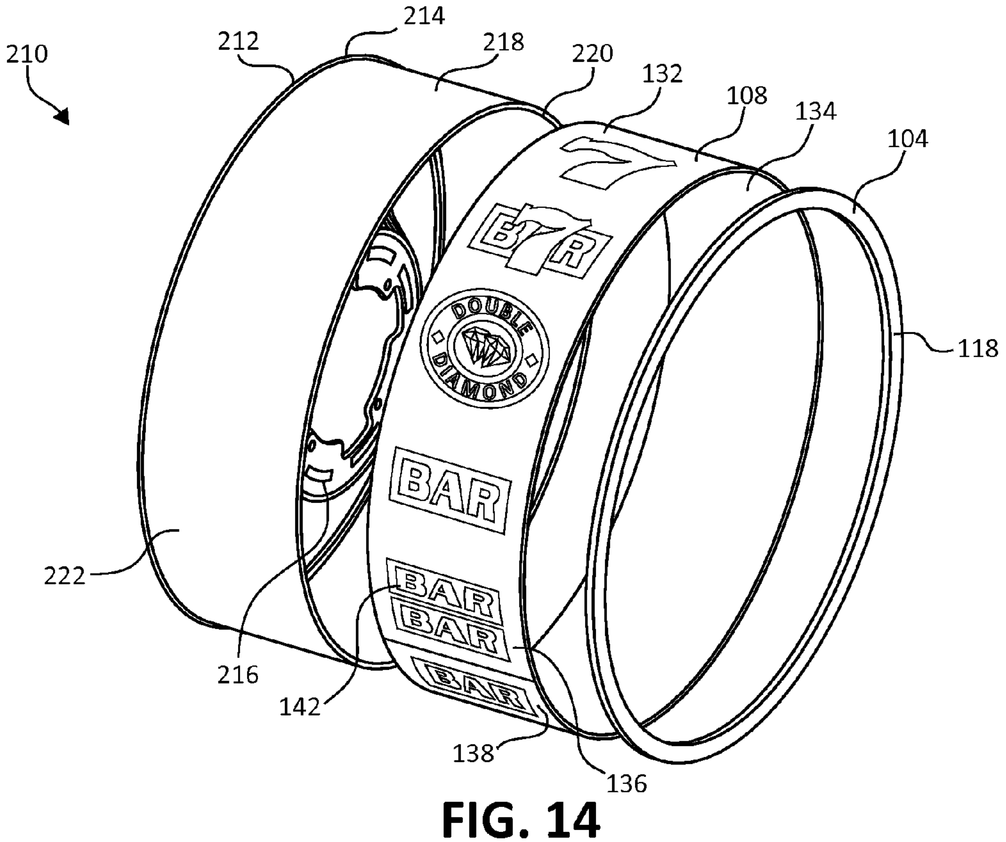
FIG. 14 is an exploded, perspective view illustration of a reel assembly, according to one embodiment of the present invention.

FIG. 14 illustrates one embodiment of a reel assembly 210. The reel assembly 210, like reel assemblies 100 and 150, includes the outer ring 104 and the reel strip 108, in one example. The reel assembly 210 additionally includes an inner drive ring assembly 212 comprising an annular rim 214, a hub 216, spokes (not shown), and a support substrate 218. The annular rim 214, the hub 216, and the spokes are each formed and positioned in a similar manner as described above for the annular rim 110, the hub 114, and the spokes 116 of the inner drive ring 102 illustrated in FIGS. 8 and 10. The support substrate 218 is largely similar to the support substrate 152 of reel assembly 150 illustrated in FIG. 11. However, the annular rim 214 and the support substrate 218 are formed as a single piece member via a known manufacturing method such as injection molding, extrusion, etc. In one embodiment, the inner drive ring assembly 212 is formed as a single piece of a transparent or translucent material. In one example, a single injection molding process is used to form the inner drive ring assembly 212, but is completed such that each of the support substrate 218 and the annular rim 214 are formed of differing materials. By forming the inner drive ring assembly 212 using different materials, each component can be manufactured with properties tied to its function while reducing overall cost. For example, the support substrate 218 is formed of a substantially transparent material and the annular rim 214 is formed of a more opaque material. In one example, the annular rim 214 may be formed of a more rigid material providing additional shape support to the support substrate 218. In this manner a single material for the entirety of the inner drive ring assembly 212 providing both transparency to the support substrate 218 and increased rigidity to the inner drive ring 212 does not need to be sourced for manufacturing.

The support substrate 218 defines a free edge 220 opposite the annular rim 214. The free edge 220 is substantially continuous and is adhered, ultrasonically welded, chemically bonded, electrostatically coupled, mechanically coupled, or otherwise suitably coupled to the outer ring 104, for example, to the flange 120 (FIG. 8) of the outer ring 104. In this manner, the support substrate 218 independently extends between, maintains the spacing of, and couples the annular rim 214 and the outer ring 104 without additional supports extending between the annular rim 214 and the outer ring 104. In one example, the support substrate 218 defines an exterior surface 222, which is coupled to the reel strip 108 via an optically clear adhesive or other chemical, electrostatic, or mechanical coupling agent. The reel strip 108 may be coupled to the exterior surface 222 of the support substrate 218 either before or after the free edge 220 of the support substrate 218 is coupled with the outer ring 104. In one embodiment, the support substrate 218 is printed with the gaming icons 124 and the reel strip 108 is eliminated similar to the description of the support substrate 172 of reel assembly 170 (FIG. 12).

Figure 15:
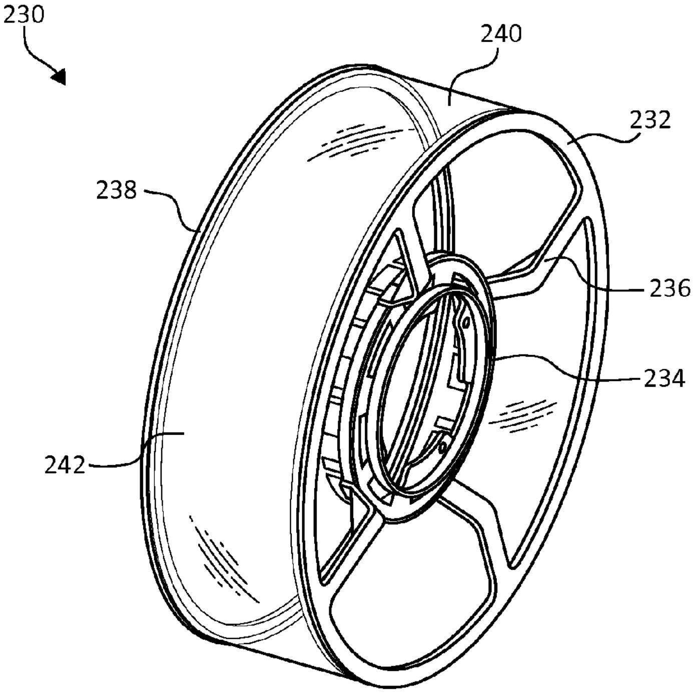
FIG. 15 is a perspective view illustration of a reel assembly, according to one embodiment of the present invention.

FIG. 15 illustrates one example of a reel assembly 230 formed as a single piece of a substantially transparent material via injection molding, extrusion, or other known manufacturing method. In one example, the reel assembly 230 includes an inner annular rim 232, a hub 234, spokes 236, an outer annular rim 238, and a support substrate 240. The inner annular rim 232 and the outer annular rim 238 have substantially identical outer diameters and are spaced from and positioned coaxially relative to one another. The hub 234 is concentrically positioned relative to and spaced from the inner annular rim 232. The spokes 236 extend from the hub 234 to the inner annular rim 232 maintaining the hub 234 positioned relative to the inner annular rim 232.

Figure 16:
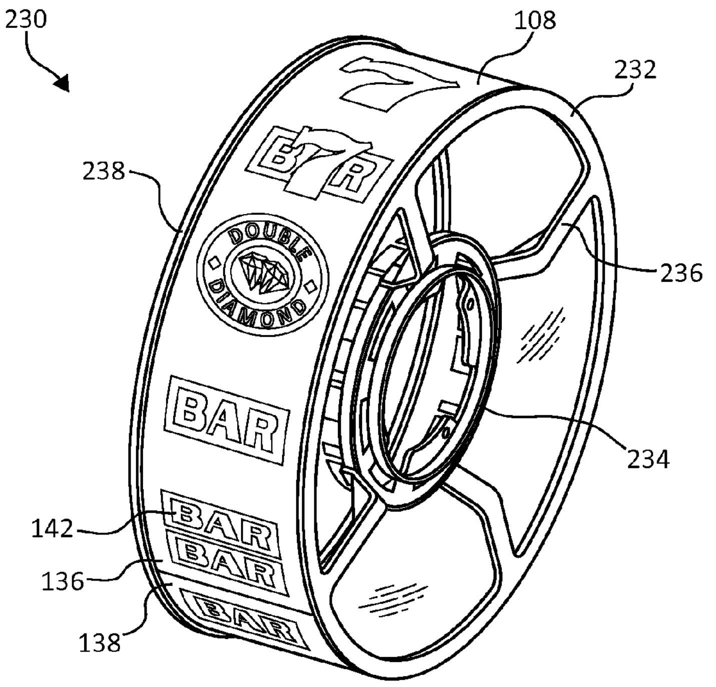
FIG. 16 is a perspective view illustration of a reel assembly, according to one embodiment of the present invention.

The support surface 240 is provided in the form of a hollow cylinder and contacts each of and extends between the inner annular rim 232 and the outer annular rim 238. The support surface 240 independently extends between the inner annular rim 232 and the outer annular rim 238 coupling and maintaining the spacing between the inner annular rim 232 and the outer annular rim 238 without additional support. The support surface 240 defines an exterior surface 242 for receiving the reel strip 108 as illustrated with additional reference to FIG. 16 and/or being directly printed with gaming icons 124 via silkscreen printing or other suitable technique as described above, for example, with respect to the reel assembly 170 illustrated in FIG. 12. In one example, a single injection molding process is used to form the reel assembly 230, but is completed such that the inner annular rim 232, the hub 234, the spokes 236, and the outer annular rim 238 are formed of a differing material than the support substrate 240.

While various reel assemblies including reel assemblies 100, 150, 170, 190, 210, and 230 are described above and illustrated in FIGS. 8-15, such reel assemblies are not an exhaustive listing of possible assemblies falling within the scope of the present invention. Other reel assemblies combining various features for one or more of the reel assemblies 100, 150, 170, 190, 210, and 230 are also contemplated and will be apparent to those of skill in the art after reading this application.

Figure 17:
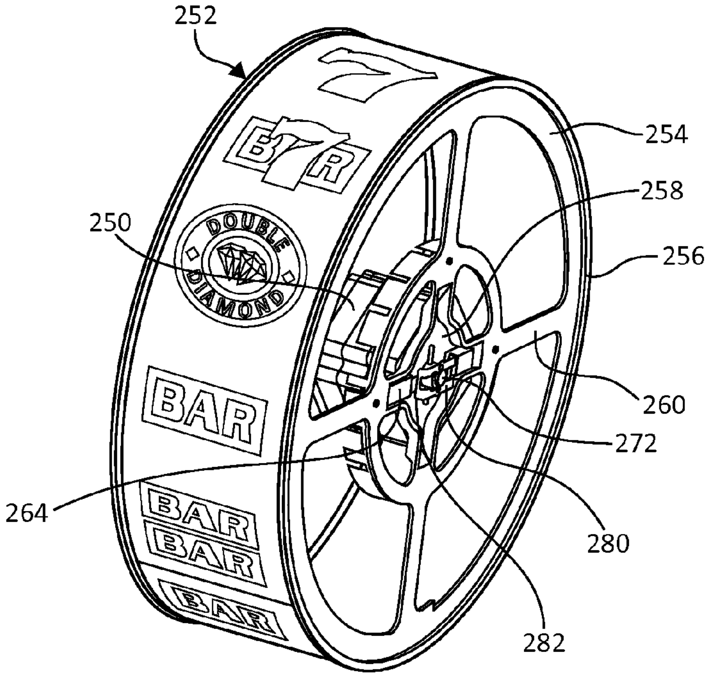
FIG. 17 is a perspective view illustration of a reel assembly, according to one embodiment of the present invention.
Figure 19:
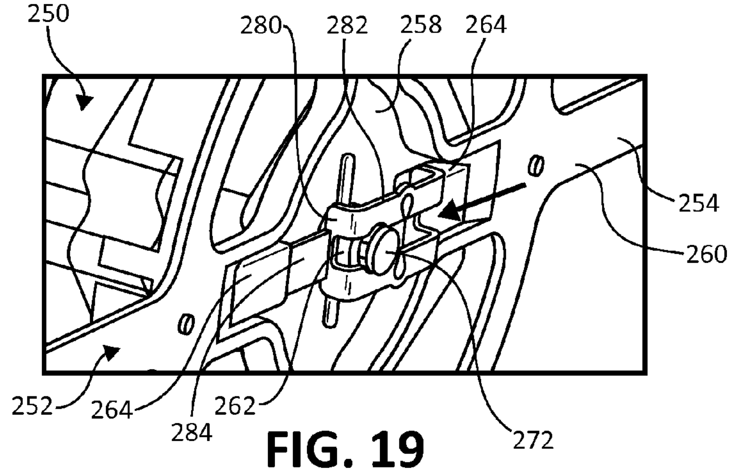
FIG. 19 is a detailed perspective view illustration of the portion of FIG. 17 including the coupling clip in an unlocked position.
Figure 20:
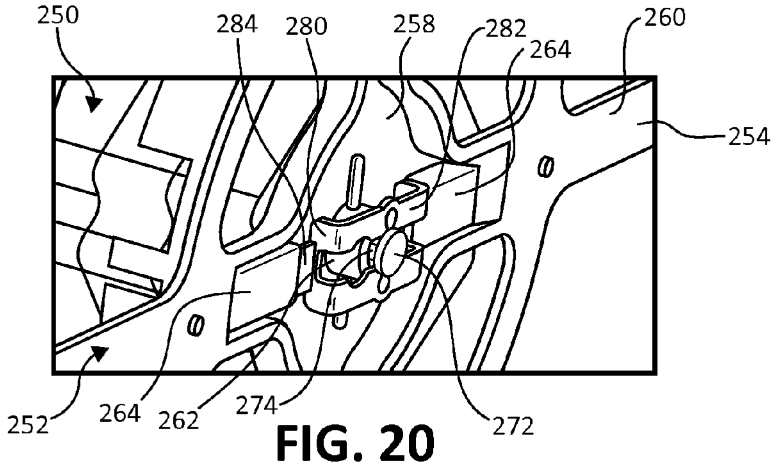
FIG. 20 is a detailed perspective view illustration of a portion of FIG. 17 including the coupling clip in a locked position.

FIG. 17 and the detail views of FIGS. 19 and 20 illustrate one example of a method for coupling a drive motor 250 to a reel assembly 252 per the present invention. The reel assembly 252 may be similar to the reel assemblies 100, 150, 170, 190, 210, and 230 described above or may be similar to prior art reel assembles such as reel assembly 44 incorporating the features to be described in detail below. In one example, the reel assembly 252 includes an inner drive ring 254, which includes an annular rim 256, a central hub 258, and spokes 260. The central hub 258 is concentrically positioned relative to and spaced from the annular rim 256. The spokes 260 couple the central hub 258 to the annular rim 256 in a manner maintaining the central hub 258 concentrically positioned relative to the annular rim 256.

The central hub 258 includes a hollow cylindrical protrusion 262 (FIGS. 19 and 20) extending outwardly from a center thereof such that an extension of a centerline (not shown) of the hollow cylindrical protrusion 262 extends through a rotational axis of the inner drive ring 254 and of the central hub 258. In one embodiment, a central opening (not shown) that is not surrounded by the hollow cylindrical protrusion 262 is formed such that the rotational axis of the inner drive ring 254 extends through the central opening. In one example, the central hub 258 further includes two enclosed channels 264 on opposing sides of the hollow cylindrical protrusion 262, and both of the two enclosed channels 264 are open toward the hollow cylindrical protrusion 262 and toward the other of the two enclosed channels. In one embodiment, each of the hollow cylindrical protrusion 262 and the two enclosed channels 264 are integrally formed with at least the central hub 258 of the inner drive ring 254 via injection molding, extrusion, or other manufacturing technique such that the inner drive ring 254 is formed as a single integral piece of material.

The drive motor 250 is positioned relative to the reel assembly 252, for example, substantially adjacent to the central hub 258. The drive motor 250 includes a drive shaft 270 extending outwardly therefrom and extending through the hollow cylindrical protrusion 262 such that a free end 272 of the drive shaft 270 extends beyond an end of the hollow cylindrical protrusion 262 opposite a remainder of the drive motor 250. In one example, the drive shaft 270 is formed with an annular groove 274 near the free end 272 extending around an entire circumference of the drive shaft 270 and/or the free end 272 is provided in the form of a capped end having a larger diameter than a remainder of the drive shaft 270.

Figure 18:
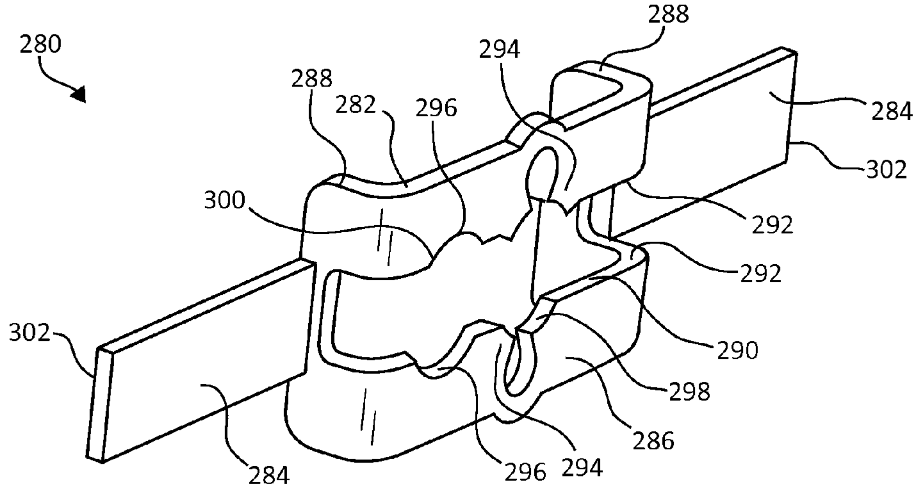
FIG. 18 is a perspective view illustration of a coupling clip of the reel assembly of FIG. 17.

To secure the drive shaft 270 in place relative to the central hub 258, the reel assembly 252 includes a slidable clip 280, which is more particularly illustrated with additional reference to FIG. 18. The slidable clip 280 includes a U-shaped main body 282 and two opposing appendages or flanges 284. More specifically, in one example, U-shaped main body 282 defines an intermediate or bridge section 286 and two offset sections 288. A different one of the two offset sections 288 extends substantially perpendicularly relative to the bridge section 286 from each of opposing end of the bridge section 286. An elongated cutout 290 is formed along a substantial entirety of the bridge section 286 and/or partially extending into each of the two offset sections 288 and defining opposing elongated edges 292 facing one another. The elongated edges 292 are substantially symmetrical to each other, according to one embodiment, and each define protruding tabs 294 near a center thereof and a recess 296 to one side of the protruding tabs 294. Protruding tabs 294 collectively define a pinched area 298 in the elongated cutout 290 having an overall circular shape and a diameter less than a diameter of the free end 272 of the drive shaft 270, but substantially equal to a diameter of the drive shaft 270 as defined within the annular groove 274 of the drive shaft 270. Conversely, the elongated cutout 290 defines an enlarged area or enlarged opening 300 between the recesses 296 having a diameter larger than the overall diameter of the free end 272 of the drive shaft 270. The protruding tabs 294 are formed thin enough so that at least a portion of the protruding tabs 294 will fit within the annular groove 274 of the drive shaft 270. In one example, a remainder of the elongated cutout 290, that is substantially all of the elongated cutout 290 other than the pinched area 298 and the enlarged area 300 has a width defined between the elongated edges 292 that is less than a diameter of the free end 272 and greater than a diameter of the drive shaft 270 such that the drive shaft 272 is free to slide along the elongated cutout 290, but that the free end 272 of the drive shaft 272 can only be moved through the elongated cutout 290 at the enlarged area 300.

Each one of the opposing flanges 284 extends outwardly from a different offset section 288 of the slidable clip 280 in an elongated manner to a free end 302. In one example, each of the opposing flanges 284 is substantially flat and sized to slidably fit within one of the enclosed channels 264 of the hub 258 of the inner drive ring 254. In one embodiment, slidable clip 280 flexes slightly to allow each of the opposing flanges 284 to be inserted into a different one of the enclosed channels 264 and is biased to return to an original orientation once so positioned. The bridge section 286 of the slidable clip 280 extends just over an outermost end of the hollow cylindrical protrusion 262 when opposing flanges 284 are at least partially maintained in each of the enclosed channels 264. As such, in one example, the bridge section 286, including the pinched area 298 and the recess 294 is generally spaced further away from the central hub 258 than the opposing flanges 284 are spaced from the central hub. The slidable clip 280 is configured to substantially linearly translate between the enclosed channels 264 inversely moving each of the opposing flanges 284 further into and further out of a respective one of the enclosed channels 264 between an unlocked position as illustrated, for example, in FIG. 19 and a locked position as illustrated, for example, in FIG. 20.

More specifically, the drive shaft 272 is moved partially through the elongated cutout 290 when the slidable clip 280 is in the unlocked position (FIG. 19) via enlarged area 300 aligning the annular groove 274 of the drive shaft 272 with the opposing elongated edges 292 of the elongated cutout 290. Once drive shaft 272 is so aligned, then, the slidable clip 280 is translated as indicated by the arrow in FIG. 19 to the locked position in which the drive shaft 272 is tightly maintained between the protruding tabs 294, and the protruding tabs 294 each extend into the annular groove 274 of the drive shaft 272. By forming the slidable clip 280 as a pre-assembled portion of the reel assembly 252, installation of the reel assembly 252 in a gaming machine having the drive shaft 272 is simplified and additional parts are not required to facilitate coupling of the reel assembly 252 with drive motor 250. In one example, the central hub 258 and the slidable clip 280 collectively form an attachment mechanism for selectively receiving a drive shaft 272 and coupling the drive shaft 272 to the inner drive ring 254 and the entire reel assembly 252.

Figure 21:
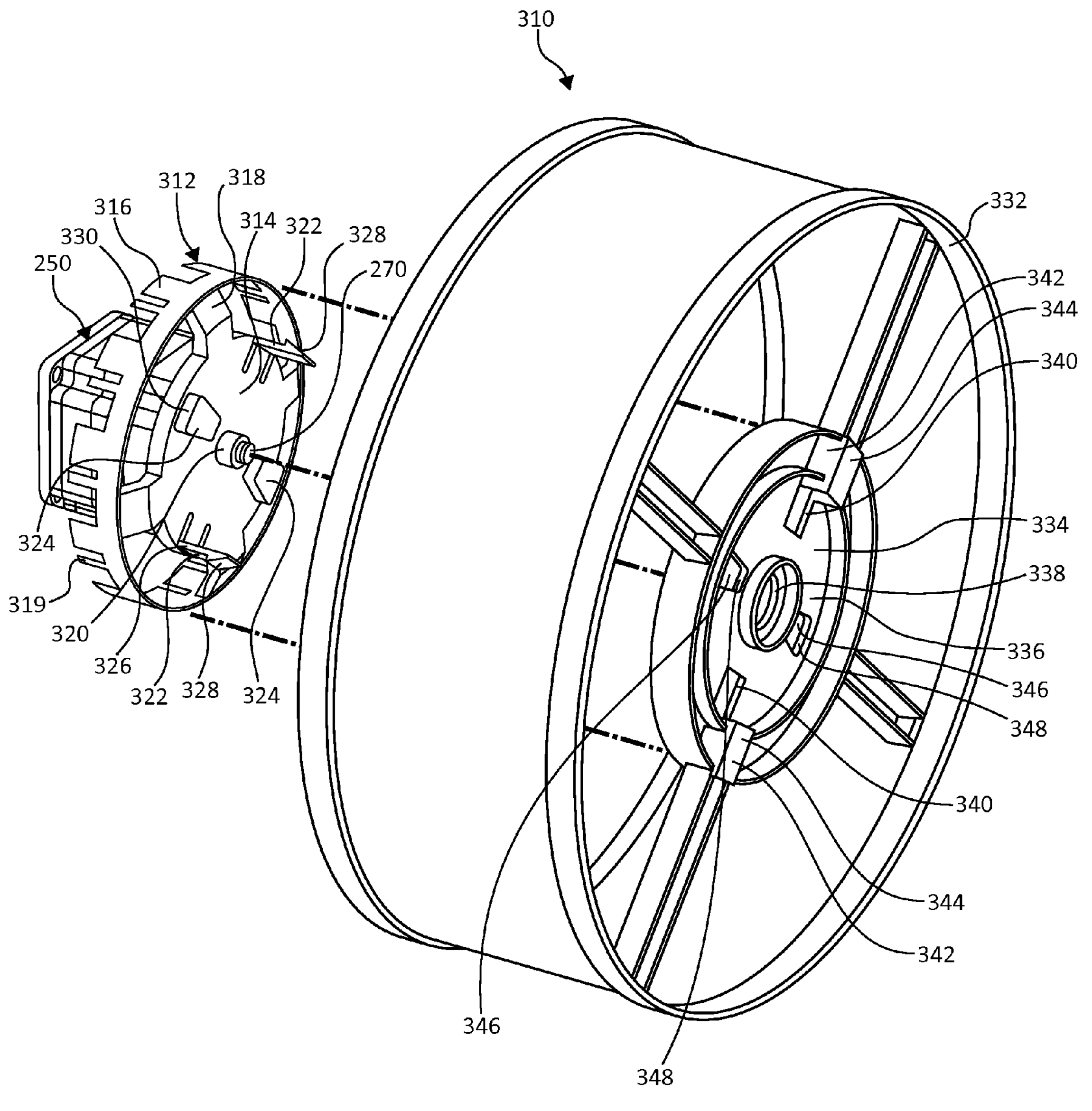
FIG. 21 is an exploded, perspective view illustration of a reel assembly and a drive motor, according to one embodiment of the present invention.

FIG. 21 illustrates one embodiment of a method for coupling the drive motor 250 to a reel assembly 310 to form a motorized reel assembly using an encoder disc 312 per the present invention. The encoder disc 312 includes a disc hub 314, a flagged exterior ring 316, and radial supports 318 in one example. The disc hub 314 is concentrically positioned relative to a remainder of the encoder disc 312 and is concentrically positioned relative to the flagged exterior ring 316 with radial supports 318 extending between and coupling the disc hub 314 to the flagged exterior ring 316. The flagged exterior ring 316 intermittently provides flags 319 irregularly spaced about a circumferences of a remainder of the flagged exterior ring 316 to provide optically sensible indications of a rotational position of the encoder disc 312 during use.

The disc hub 314 includes a center protrusion 320 in the form of a hollow cylinder, in one example, coupling flanges 322, and/or registration protuberances 324. Each of the center protrusion 320, the coupling flanges 322, and the registration protuberances 324 each interact with one of the drive motor 250 and the reel assembly 310. More specifically, a drive motor shaft 270 of the drive motor 250 extends through a cavity formed through the center protrusion 320 and is secured thereto via a suitable fastener, friction fit, keyed features, or other suitable manner such that rotation from the drive motor shaft 270 is imparted to the encoder disc 312 and the reel assembly during use. In one example, the drive motor shaft is keyed, e.g., knurled, splined, or otherwise made less smooth to prevent slippage between the drive motor shaft 270 and the encoder disc 312. Each of the coupling flanges 322 extends from an outer perimeter of the disc hub 314 with a substantially perpendicular orientation relative to the disc hub 314 first with an elongated, for example, rectangular extension 326 and then capped with a tapered hook 328 extending at least partially radially outwardly relative to the rectangular extension 326. In one embodiment, the disc hub 314 defines a pair of (i.e. two of) the coupling flanges 322, and the coupling flanges 322 are located about 180 degrees apart from one another on opposing sides of the center protrusion 320.

In one example, the registration protuberances 324 are a pair of registration protuberances 324 each extending from the disc hub 314 at locations that are circumferentially centered between the two coupling flanges 322, for example, at locations about 180 degrees apart from each other and about 90 degrees apart from each of the two coupling flanges 322. In one example, each of the registration protuberances 324 is formed as a broad protrusion from the disc hub 314 to define perimeter edges 330 extending substantially perpendicularly from an adjacent surface of the disc hub 314.

In one example, the reel assembly 310 includes a center drive hub 334 defining an exterior-facing surface 336 and a central aperture 338 having a diameter at least as great as a diameter of the drive motor shaft 270. The center drive hub 334 additionally defines flange-receiving apertures 340 opposite one another and protuberance-receiving apertures 346 circumferentially centered between the flange-receiving apertures 340. In one embodiment, the flange-receiving apertures 340 are positioned about 180 degrees apart form each other and about 90 degrees apart from each of the protuberance-receiving apertures 346. The flange-receiving apertures 340 are each sized to allow one of the coupling flanges 322 to pass therethrough. In one example, the two coupling blocks 342 are each positioned to be adjacent and radially outside a corresponding one of the flange-receiving apertures 340. Each of the coupling blocks 342 is raised, that is, outwardly protrudes, relative to the exterior-facing surface 336 of the center drive hub 334 to define an exposed surface 344 opposite the exterior-facing surface 336, where each of the exposed surface 244 and the exterior-facing surface 336 face away from the disc hub 314. The protuberance-receiving apertures 346 each have a shape substantially identical to and a slightly larger size than a corresponding one of the registration protuberances 324 and each define an interior edge 348.

When coupling the drive motor 250 to the reel assembly 310, the drive shaft 270 is aligned with, pushed through, and secured to the center protrusion 320 of the disc hub 314. The drive motor 250 and the encoder disc 312 are collectively moved to push the drive shaft 270 through the central aperture 338 of the center drive hub 334 thereby interposing the encoder disc 312 between the drive motor 250 and the center drive hub 334. As the drive shaft 270 is pushed through the central aperture 338, the drive motor encoder disc 312 is rotated as and if needed to align each of the coupling flanges 322 of the encoder disc 312 with a corresponding one of the flange-receiving apertures 340 and each registration protuberance 324 with a corresponding one of the protuberance-receiving apertures 346. Continued movement of the encoder disc 312 toward the center drive hub 334 results in the tapered hook 328 interacting with the center drive hub 334 in a manner flexing each of the coupling flanges 322 inwardly to move through the corresponding one of the flange-receiving apertures 340. The coupling flanges 322 are each biased to their original position, such that once the corresponding one of the tapered hooks 328 passes through the corresponding one of the flange-receiving apertures 340, the coupling flange moves back to its original position resulting in outward movement of the coupling flanges 322 such that the tapered hooks 328 hook over and interacts with the exposed surface 344 of the corresponding one of the coupling blocks 342 immediately adjacent the respective flange-receiving aperture 340. When the tapered hooks 328 interact with the exposed surface 344, the coupling flanges 322 limit, if not prevent, movement of the center drive hub away from the disc hub 314, for example, as illustrated with additional reference to the assembled view illustration of FIG. 22. In one embodiment, the interaction between the coupling flanges 322 and the coupling blocks 342 and between the registration protuberances 324 with the protuberance-receiving apertures 346 allows for secure coupling of the reel assembly 310 solely with the encoder ring 312, and in one instance, the drive motor 250, substantially without the use of tools and/or additional fasteners.

Figure 22:
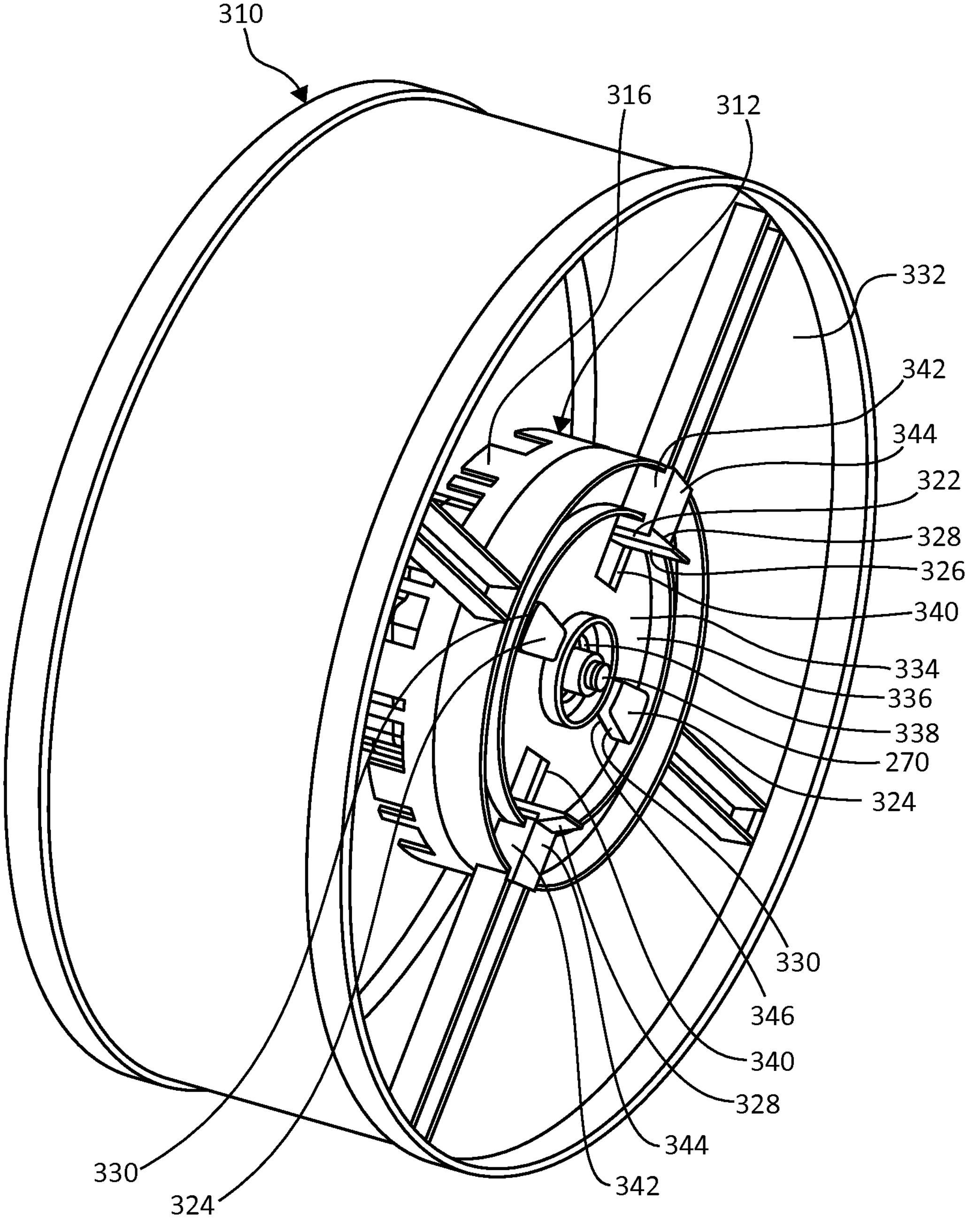
FIG. 22 is a perspective view illustration of the reel assembly and the drive motor of FIG. 21.

Substantially simultaneously with movement of coupling flanges 322 through flange-receiving apertures 340, registration protuberances 324 are moved into corresponding ones of the protuberance-receiving apertures 346 such that the interior edges 348 of each of the protuberance-receiving apertures 346 surrounds and directly abuts the perimeter edges 330 of the respective registration protrusion 324 as illustrated in FIG. 22. In this manner, coupling flanges 322 and registration protuberances 324 both serve to limit undesired shifting or rotation of the reel assembly 310 relative to the encoder disc 312 and the drive motor 250 allowing drive motor 250 to have more precise control over rotation of the reel assembly 310.

Figure 23:
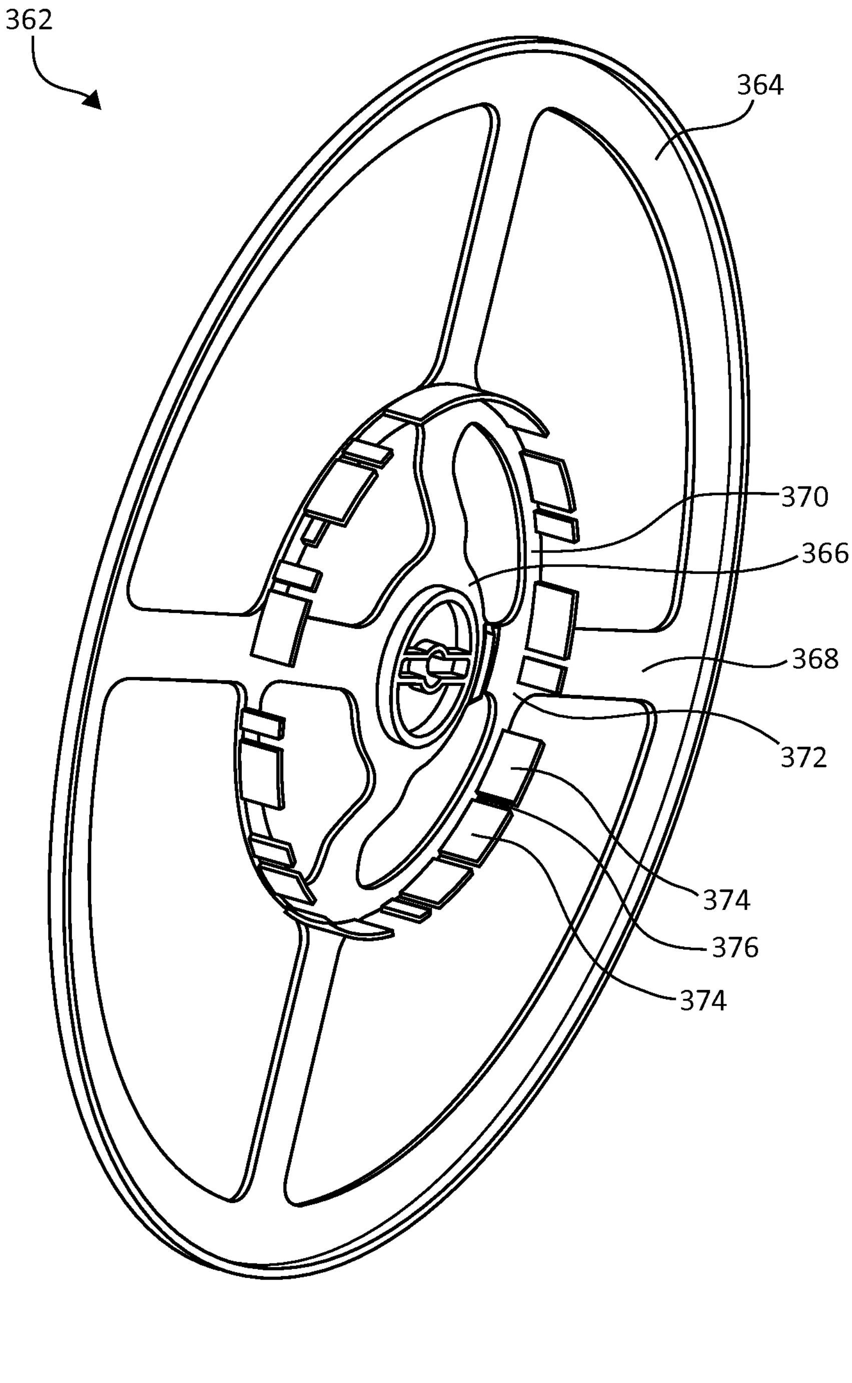
FIG. 23 is a perspective view illustration of an inner drive ring, according to one embodiment of the present invention.

FIG. 23 illustrates an example of an inner drive ring 362 according to the present invention that can generally be used in place of any of the other inner drive rings 102, 212, 254, 282, etc. described in this application. The inner drive ring 362 includes an annular rim 364, a hub 366, and spokes 368. The hub 366 is concentrically positioned relative to and spaced from the annular rim 364. The spokes 368 extend from the hub 366 to the annular rim 364 maintaining the hub 366 in a static position relative to the annular rim 364. In one example, an intermediate ring 370 is positioned concentrically with the annular rim 364 and the hub 366 and between the annular rim 364 and the hub 366. The intermediate ring 370 intersects each of the spokes 368 between the annular rim 364 and the hub 366 and defines an interior surface 372.

The inner drive ring 362 additionally includes encoder flags 374, for example, similar to the encoder flags 319 of encoder disc 312 (FIGS. 21 and 22), each circumferentially spaced from other ones of the encoder flags 374 to define spaces 376 therebetween and extend from the intermediate ring 370. In one example, the encoder flags 374 each extend in a direction transverse or substantially perpendicular to the direction the spokes 368 extend between the annular rim 364 and the hub 366. Each encoder flag 374 is sized to provide optical interference in a predetermined manner such that an optical sensor can generally determine a position of the inner drive ring 362 based on sensing of the encoder flags 374 and the spaces 376 therebetween. In one embodiment, the inner drive ring 362 is formed as a single piece of material including each of the annular rim 364, the hub 366, the spokes 368, the intermediate ring 370, and the encoder flanges 374 formed via injection molding or other suitable manufacturing technique. In one example, the inner drive ring 362 attached directly to a drive motor (not shown) eliminating the need for a separate encoder disc.

Figure 24:
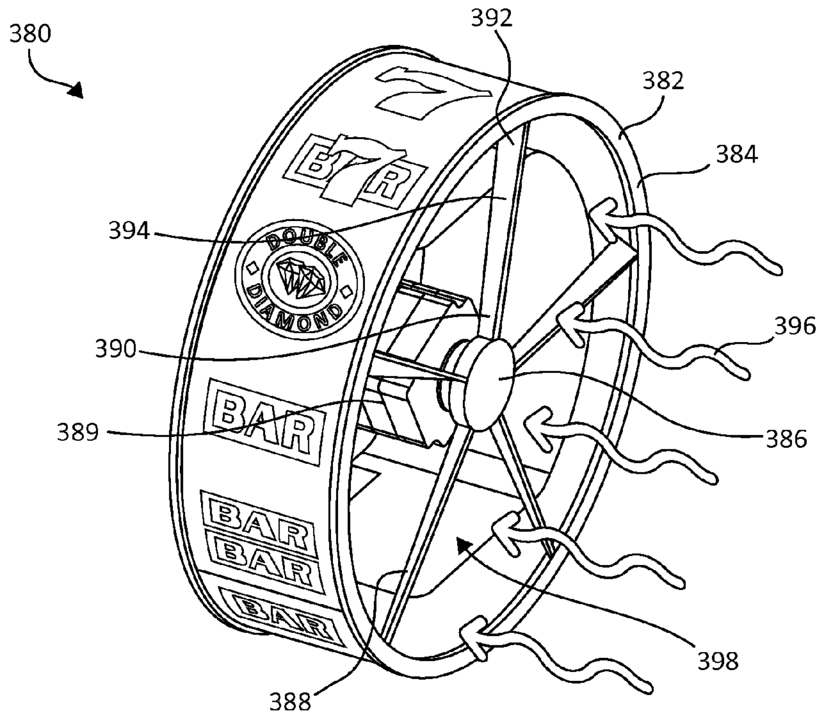
FIG. 24 is a perspective view illustration of a reel assembly, according to one embodiment of the present invention.

A reel assembly 380 with another example of an inner drive ring 382 is illustrated in FIG. 24. The inner drive ring 382 includes an annular rim 384, a central hub 386 concentrically positioned with and centered within the annular rim 384, and spokes 388 extending be tween the annular rim 384 and the central hub 386. The hub 386 includes a reception cavity or other attachment feature for receiving a drive shaft (not shown) of a drive motor 389 such that rotation form the drive shaft is imparted to the hub 386 and the entire reel assembly 380 during use. In one example, an encoder ring (not shown) is coupled between or otherwise placed adjacent to the drive motor 389 and the hub 386.

Each of the spokes 388 extends from a hub edge 390 to a rim edge 392. In one example, the hub edge 390 extends substantially parallel to an axis of the inner drive ring 382. Each of the spokes 388 is twisted or rotated as it nears the annular rim 884 such that the rim edge 392 is not positioned to be substantially parallel to an axis of the inner drive ring 382. For example, each spoke 388 is generally formed of a twisted planar material that extends substantially parallel to a rotational axis of the reel assembly 380 at the hub edge 390, and is twisted to open up and reveal a broader surface of the spoke 388 at the rim edge 392. As such, the rim edge 392 extends in a direction non-parallel with the rotational axis of the reel assembly 380, for example, at an angle of at least about 10 degrees from parallel with the rotational axis.

The twist of each spoke 388 defines an air contact surface 394 extending between the hub edges 390 and the rim edge 392 that is not substantially planar. When reel assembly 380 is rotated about the central hub 386 during use, the twisting orientation of the air contact surface 394 of each of the spokes 388 draws air, which is generally indicated with arrows 396 in FIG. 24, into a center cavity 398 formed within the reel assembly 380. The air 396 cools the center cavity 398, which is of increased importance where lights or other electronic items emitting heat are also positioned in or near the center cavity 398 and areas adjacent the inner drive ring 382 are generally maintained at cooler temperatures. The direction each of the spokes 388 is twisted, inwardly or outwardly from the hub edge 390 to the rim edge 392 is dependent upon the direction the reel assembly will be rotated such that that the air 396 contacted by the air contact surfaces 394 is drawn into the cavity 398.

Other examples of twists or orientation of the spokes 388 are also contemplated in which the hub edges 390 do not extend substantially parallel to a rotational axis of the inner drive ring 282, but where the air contact surface 394 is otherwise configured to draw air 396 into the cavity 398.

Figure 25:
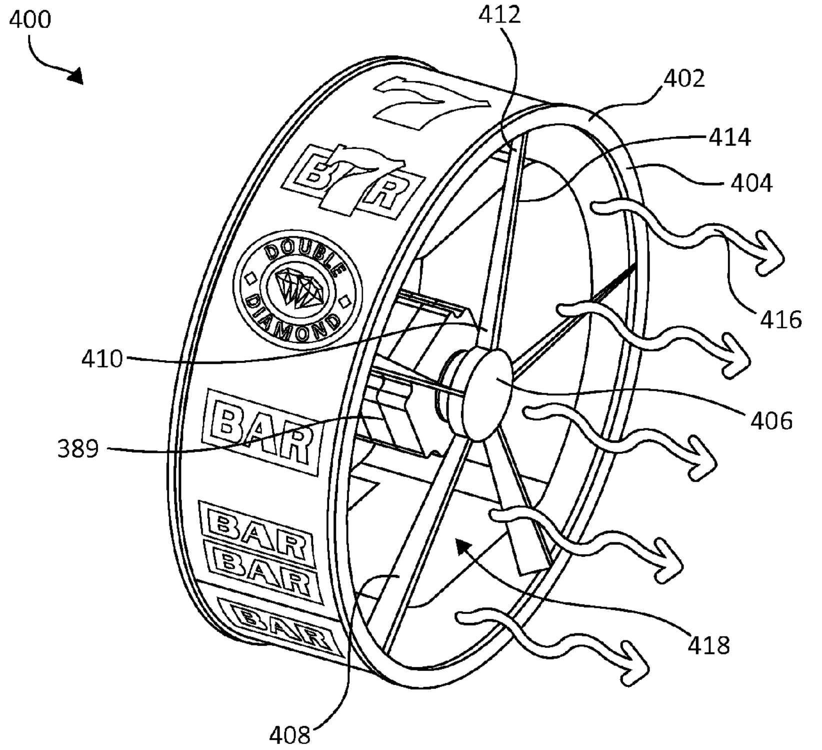
FIG. 25 is a perspective view illustration of a reel assembly, according to one embodiment of the present invention.

A reel assembly 400 with another example of an inner drive ring 402 is illustrated in FIG. 25. The inner drive ring 402 includes an annular rim 404, a central hub 406 concentrically positioned with and centered within the annular rim 404, and spokes 408 extending between the annular rim 404 and the central hub 406. The hub 406 includes a reception cavity or other attachment feature for receiving a drive shaft (not shown) of a drive motor 389 such that rotation form the drive shaft is imparted to the hub 406 and the entire reel assembly 400 during use. In one example, an encoder ring (not shown) is coupled between or otherwise placed adjacent to the drive motor 389 and the hub 406.

Each of the spokes 408 extends from a hub edge 410 to a rim edge 412. In one example, the hub edge 410 extends substantially parallel to an axis of the inner drive ring 402. Each of the spokes 408 is twisted or rotated as it nears the annular rim 404 such that the rim edge 412 is not positioned to be substantially parallel to an axis of the inner drive ring 402. For example, each spoke 408 is generally formed of a twisted planar material that extends substantially parallel to a rotational axis of the reel assembly 400 at the hub edge 410, and is twisted to open up and reveal a broader surface of the spoke 408 at the rim edge 412. As such, the rim edge 412 extends in a direction non-parallel with the rotational axis of the reel assembly 380, for example, at an angle of at least about 10 degrees from parallel with the rotational axis.

The twist of each spoke 408 defines an air contact surface 414 extending between the hub edges 410 and the rim edge 412 that is not substantially planar. When the reel assembly 400 is rotated about the central hub 406 during use, the twisting orientation of the air contact surface 414 of each of the spokes 408 pushes air, which is generally indicated with arrows 416 in FIG. 25, out of a center cavity 418 formed within the reel assembly 400. Movement of the air 416 cools the center cavity 418 by pushing heat emitted from lights or other electronic items positioned in or near the center cavity 418 out of the center cavity 418. The direction each of the spokes 418 is twisted, inwardly or outwardly from the hub edge 410 to the rim edge 412 is dependent upon the direction the reel assembly will be rotated such that that the air 416 contacted by the air contact surfaces 414 is pushed out of the cavity 418. Other examples of twists or orientation of the spokes 408 are also contemplated in which the hub edges 420 do not extend substantially parallel to a rotational axis of the inner drive ring 402, but where the air contact surface 414 is configured to draw air 416 into the cavity 418.

Figure 26:
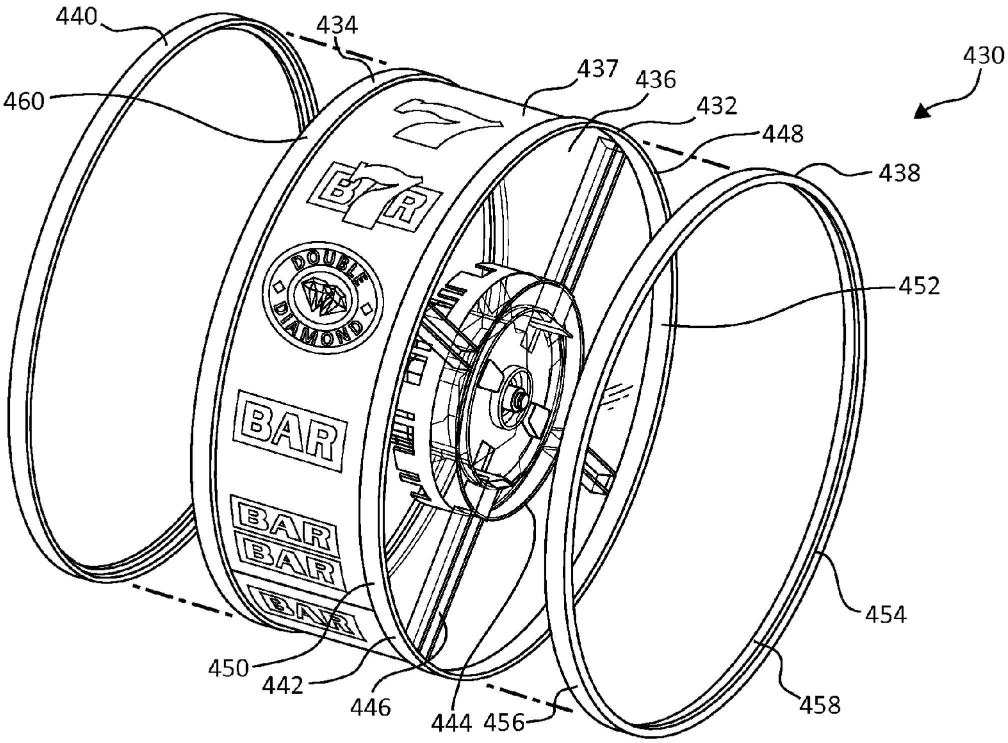
FIG. 26 is a partially exploded, perspective view illustration of a reel assembly and a drive motor, according to one embodiment of the present invention.
Figure 27:
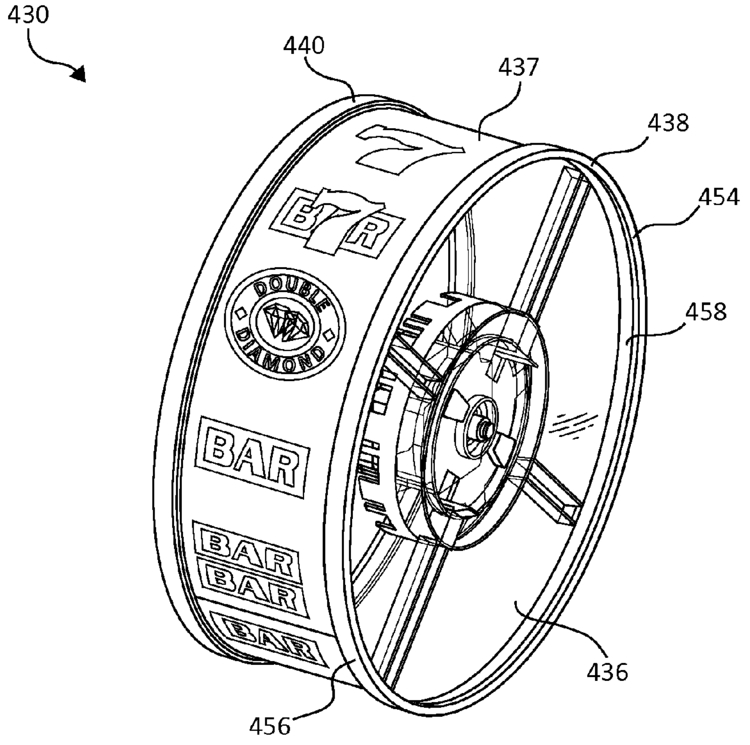
FIG. 27 is a perspective view illustration of a reel assembly and a drive motor, according to one embodiment of the present invention.

FIGS. 26 and 27 illustrate an exploded view and a non-exploded view of one example of a reel assembly 430 including cosmetic enhancements. For example, the reel assembly 430 includes an inner drive ring 432, an outer ring 434 spaced from and similarly sized in comparison to the inner drive ring 432, a support substrate 436 extending between the inner drive ring 432 and the outer ring 434, and a reel strip 437 covering the support substrate 436. In addition, the reel assembly 430 includes an inner rim cover 438 and an outer rim cover 440, which each removably couple with a different one of the inner drive ring 432 and the outer ring 434 to provide a cosmetic enhancement in the form of patterned, colored, metallic, or otherwise aesthetically enhanced boundary to the reel strips 437 when viewed by a user of an associated gaming machine.

For example, inner drive ring 432 includes an annular rim 442, a central hub 444, and spokes 446. The hub 444 is concentrically positioned relative to and spaced from the annular rim 442. The spokes 446 extend from the hub 444 to the annular rim 442 circumferentially spaced from one another and maintaining the hub 444 positioned relative to the annular rim 442. In one example, the annular rim 442 defines a side edge 448 facing away from the outer ring 434, an exterior surface 450, and an interior surface 452. The exterior surface 450 and the interior surface 452 each extend in a similar direction from opposite sides of the side edge 448. In one embodiment, the spokes 446 are offset from the side edge 448 providing a span of uninterrupted interior surface 452 adjacent the side edge 448 for receiving the inner rim cover 438 or a portion thereof as further described below.

The inner rim cover 438 includes a sidewall 454, an exterior wall 456, and an interior wall 458. Sidewall 454 is sized slightly larger than the side edge 448, and each of the exterior wall 456 and the interior wall 458 extend in a first direction away from opposing sides of the sidewall 454. In this manner, the inner rim cover 438 has a substantially C-shaped cross section with an open side (not shown) opposite the sidewall 454. The inner rim cover 438 is formed such that at least the exterior wall 456 presents an aesthetic enhancement to the overall reel assembly 430. In one example, the inner rim cover 438 presents a metallic appearance, a different color than the reel strip 437, a facetted appearance, etc. to enhance the cosmetic appeal of the reel assembly 430 and, in one embodiment, to correspond with an overall visual theme of a gaming machine housing the reel assembly 430.

The inner rim cover 438 slides over the annular rim 442 such that the annular rim 442 is positioned within the opening of the inner rim cover 438 and that the side edge 448, the exterior surface 450, and the interior surface 452 of the annular rim 442 are substantially, if not entirely, covered by the sidewall 454, the exterior wall 456, and the interior wall 458 of the inner rim cover 438, respectively. The inner rim cover 438 may be removably coupled to the annular rim 442 via a friction fit or other mechanical interference fit. In one example, the inner rim cover 438 is rigidly secured to the annular rim 442 via mechanical interference fit, adhesive, ultrasonic welding, or other coupling or combination of available coupling techniques.

The outer rim cover 440 is formed substantially identically to the inner rim cover 438 and is sized to substantially, if not entirely, cover the outer ring 434 or at least an annular rim 460 thereof. The outer rim cover 440 fits over and cosmetically enhances the outer ring 434 in any one or more of the manners described above for the inner rim cover 438. In one example, where each of the inner rim cover 438 and the outer rim cover 440 removably snap or otherwise fit over portions of the inner drive ring 432 and the outer ring 434, the inner rim cover 438 and outer rim covers 440 are configured for removal and replacement for use in different gaming machines and/or when the same gaming machine is undergoing an aesthetic update or overhaul. As such, the visual appeal of the reel assembly 430 can be relatively easily changed without requiring the expense of new components of the reel assembly 430 other than the reel strip 437 and/or the inner rim cover 438 and the outer rim cover 440.

Figure 28:
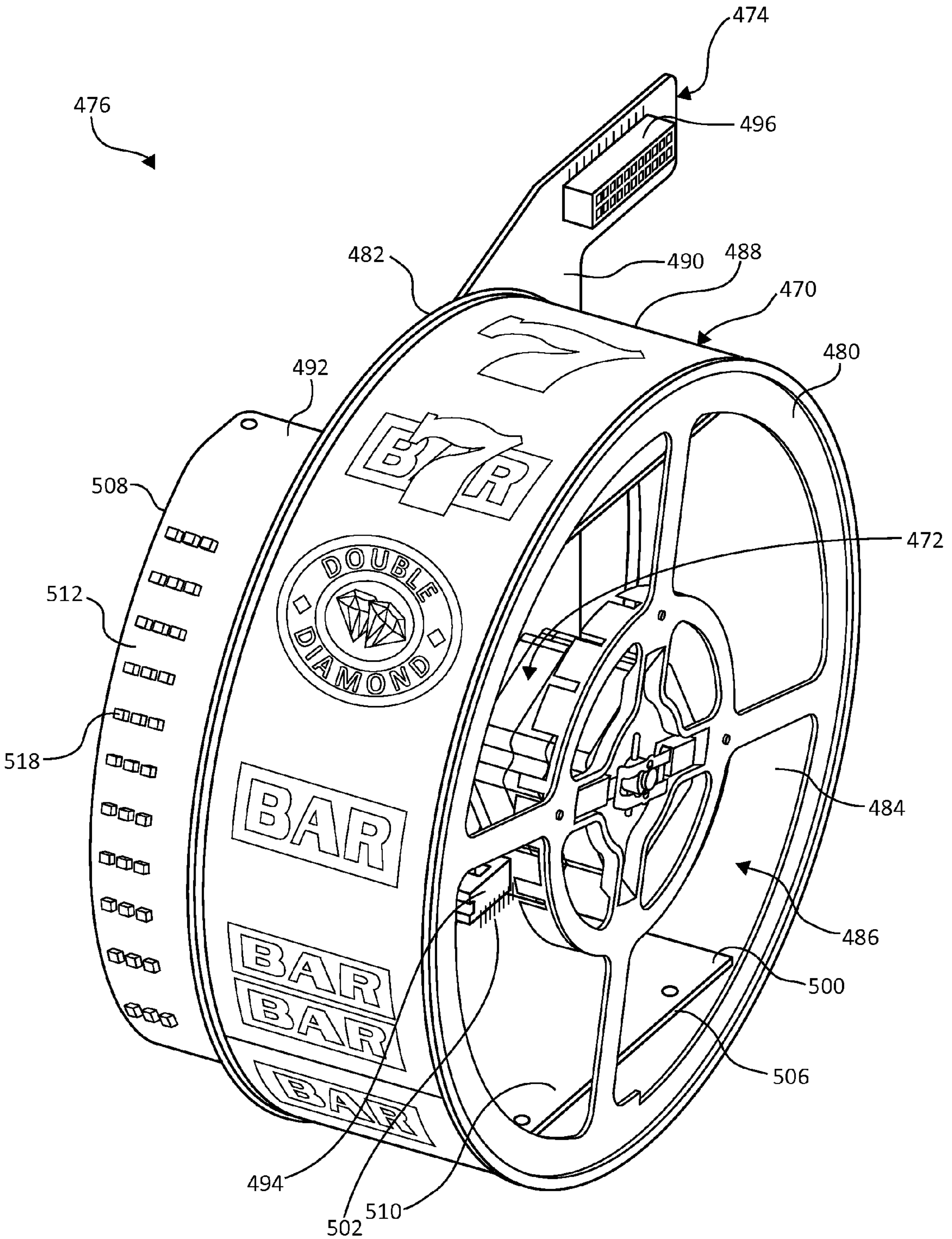
FIG. 28 is a perspective view illustration of a reel assembly, a drive motor, and a light assembly, according to one embodiment of the present invention.

FIG. 28 illustrates one example of a reel assembly 470, a drive motor 472, and a light assembly 474 to collectively define an enhanced reel assembly 476 for use in a gaming machine such as a reel slot machine. Reel assembly 470 is similar or substantially identical to other reel assemblies described herein and includes an inner drive ring 480, an outer ring 482, a support substrate 484 extending substantially continuously between the inner drive ring 480 and the outer ring 482, and a reel strip 488 substantially covering an exterior surface (not shown) of the support substrate 484. An inside cavity 486 is defined within the reel assembly 470 substantially surrounded by the inner drive ring 480, the outer ring 482, and the support substrate 484. Both the support substrate 484 and the reel strip 488 are often transparent and/or at least partially translucent. Accordingly, back lighting is able to greatly enhance the visual appeal of the reel assembly 470.

Figure 29:
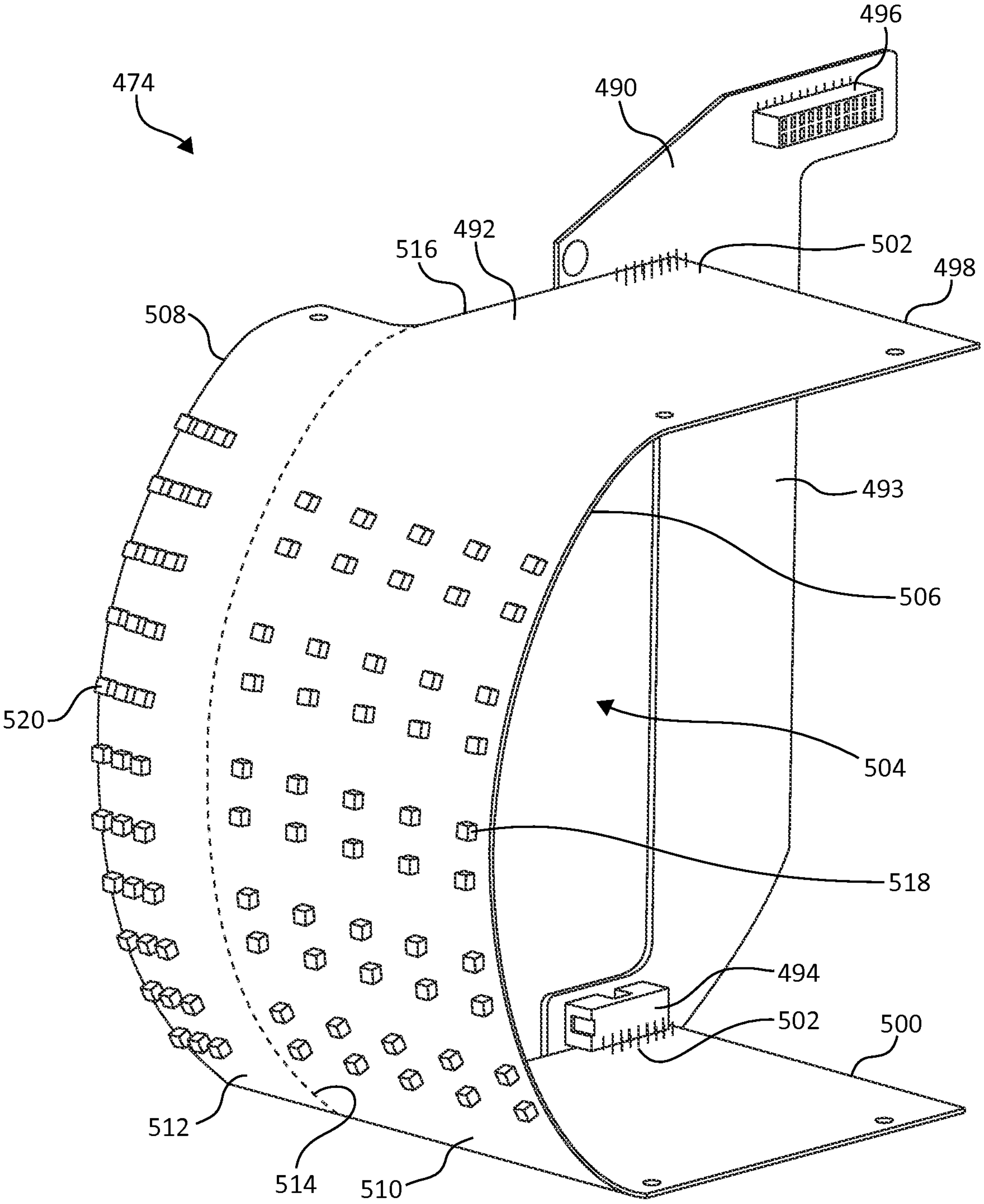
FIG. 29 is a perspective view illustration of the light assembly of FIG. 28, according to one embodiment of the present invention.

One example of the light assembly 474 for use with the reel assembly 470 is illustrated in FIG. 28 and, more particularly, in FIG. 29. The light assembly 474 includes an interface board 490 and a flexible printed circuit board (PCB) 492. The interface board 490 is a substantially rigid printed circuit board or other electrical board and is elongated and configured to electrically interface with other portions of a corresponding gaming machine via machine interface plugs 496 or other suitable electrical connection. The interface board 490 also includes two longitudinally spaced apart connection plugs 494 for each electrically coupling with the flexible PCB 492. In one embodiment, the connection plugs 494 are each spaced apart on and extend from a first primary surface 493 of the flexible PCB 492. In one example, the connection plugs 494 are spaced apart a distance less than an inner diameter of the outer ring 482.

The flexible PCB 492 is elongated and extends longitudinally between a first end 498 and a second end 500 and laterally between an inner edge 506 and an outer edge 508 thereof. Each of the first end 498 and the second end 500 define connection zones 502, for example, near the outer edge 508, that receive the connection plugs 494 of the interface board 490. In order to be coupled with the interface board 490, the flexible PCB 494 bends to bow outwardly between the first end 498 and the second end 500 forming a substantially C-shape with an opening 504 being formed between the interface board 490 and the flexible PCB 494 and with a primary face of the flexible PCB 494 facing the support substrate 484. In one example, the outer edge 508 includes an indentation 516 near each of the first end 498 and the second end 500 such that interface board 490 aligns with the indentation 516 such that the interface board 490 adds little or no additional lateral size to the flexible PCB 492.

In one example, the flexible PCB 494 defines two areas, that is, a reel section 510 and a sidelight section 512 divided by an imaginary line generally indicated as a dashed line 514 in FIG. 29. The reel section 510 is configured to fit within the inside cavity 486 of the reel assembly 470 and has a width substantially equal to a width of the reel strip 488. The sidelight section 512 extends beyond the inside cavity 486 to a side of the outer ring 482 of the reel assembly 470 opposite the inner drive ring 480.

The reel section 510 includes an array of light sources, such as light emitting diodes (LEDs) 518, mounted to the primary surface of the flexible PCB 494 providing back lighting to the reel strip 488 through the support substrate 484. The particular arrangement of the LEDs 518 may vary, but in one example, includes a sequence of linear lateral lines of the LEDs 518 across a longitudinal arc. The size of the longitudinal arc corresponds with the reel strip 488 position so as to illuminate a front portion of the reel strip 488 in the gaming machine (not shown) viewed by the gamer generally without causing visible dark spots or shadows in the reel strip 488. In one embodiment, the longitudinal arc of LEDs 518 is sized such that the back side of the reel strip 488, which is not visual to the game, is generally not illuminated. For example, the longitudinal arc of LEDs 518 is defined by an angle of less than about 700, and/or greater than about 400, for instance, between about 450 and about 600, as measured from a center of the reel assembly 470. In this manner, the entire front portion of the reel strip 488 is illuminated by LEDs 518 supported by a single preformed flexible PCB 494 rather than by a plurality of individual PCB boards linked to one another as in the prior art. By eliminating use of multiple PCB boards supporting back lighting for the reel assembly 470, fewer electrical connections need to be made during assembly and the bracketing support for the multiple PCB boards is eliminated. Accordingly, the light assembly 474 provides for easier assembly and fewer parts to support and electrically link, while providing for a stable and even lighting of an associated reel strip 488.

The sidelight section 512 of the flexible PCB 494 corresponds with a sidelight area or window (not shown) in a gaming machine between to adjacent reel assemblies 470. The sidelight section 512 includes an array of light sources, such as light emitting diodes (LEDs) 520, mounted to the primary surface of the flexible PCB 494 providing side or divider light adjacent to the reel assembly 470. The particular arrangement of the LEDs 520 may vary, but in one example, includes a sequence of linear lateral lines of the LEDs 520 across a longitudinal arc. The size of the longitudinal arc corresponds with the size of the reel strip 488 and/or other desired illumination dimensions to be viewable by the user of the associated gaming machine. In one example, the size of the longitudinal arc of LEDs 520 is substantially identical to the size of the longitudinal arc of LEDs 518.

The light assembly 474 is slid into the inside cavity 486 of the reel assembly 470 as illustrated in FIG. 28 such that flexible PCB 494 is positioned just behind a front portion of the reel strip 488 and the support substrate 484 such that LEDs 518 are directed toward the front portion of the reel strip 488. In one example, the interface board 490 extends to an outer side of the reel assembly 470 just outside the outer ring 482. The curvature of the flexible PCB 494 allows the drive motor 472 to extend through the opening 504 in the light assembly 474 to interface with the inner drive ring 480 while being position so as not to impede rotation of the reel assembly 470 while the light assembly 474 remains statically positioned. When the light assembly 474 is so positioned, the sidelight section 512 extends out beyond the outer ring 482 of the reel assembly 410 as shown in FIG. 28 to provide illumination to sidelights on an outer side of the reel assembly 470. By providing a single flexible PCB 494 with both a reel section 510 and a sidelight section 512 each supporting a plurality of LEDs 518 and 520, additional lighting structure is not necessary to provide side or divider lights adjacent reel assemblies 470, in the gaming machine, which, in turn, reduces the assembly complexity and the cost of providing the associated gaming machine.

Figure 30:
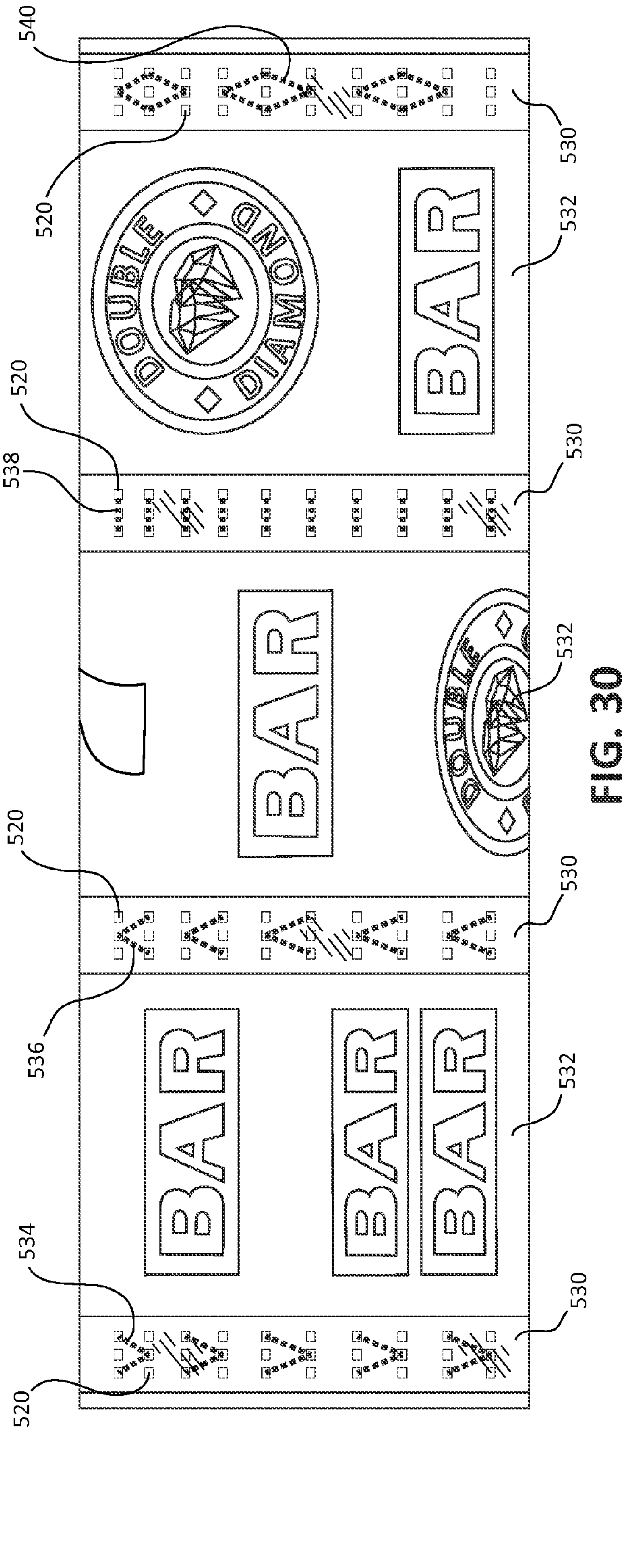
FIG. 30 is a front view illustration of a light arrangement, according to one embodiment of the present invention.

The presentation of the LEDs 520 on sidelight section 512 of the flexible PCB 494 provides for additional flexibility in providing the sidelights to compliment the reel assembly 470 than typical single or few light source sidelights. The array of LEDs 520 provides a visual grid of LEDs 520 with both a number of rows and columns of LEDs 520. This grid allows for various illumination sequences of the LEDs 520 varying the end effect of the sidelights on the overall aesthetics of the gaming machine. For example, FIG. 30 illustrates various sequences or lighting patterns 534, 536, 538, and 540 generally indicated with dashed lines for illustrative purposes created by illuminating different ones of the LEDs 520. Changing the illumination of LEDs 520 between patterns 534, 536, 538, 540, and others patterns creates an animated look or other look of movement that further enhances the visual appeal of a gaming machine. In one example, in a gaming machine (not shown) including windows 530 and 532 for respectively viewing sidelight LEDs 520 and reel assembly 470 (FIG. 28) through respectively. In one embodiment, such windows 520 and/or 532 may include diffusive or other optical qualities that dissipate the light emitted from the LEDs 518 and 520 such that the light is not generally presented as distinct point lighting from each of LEDs 518 and 520.

Figure 32:
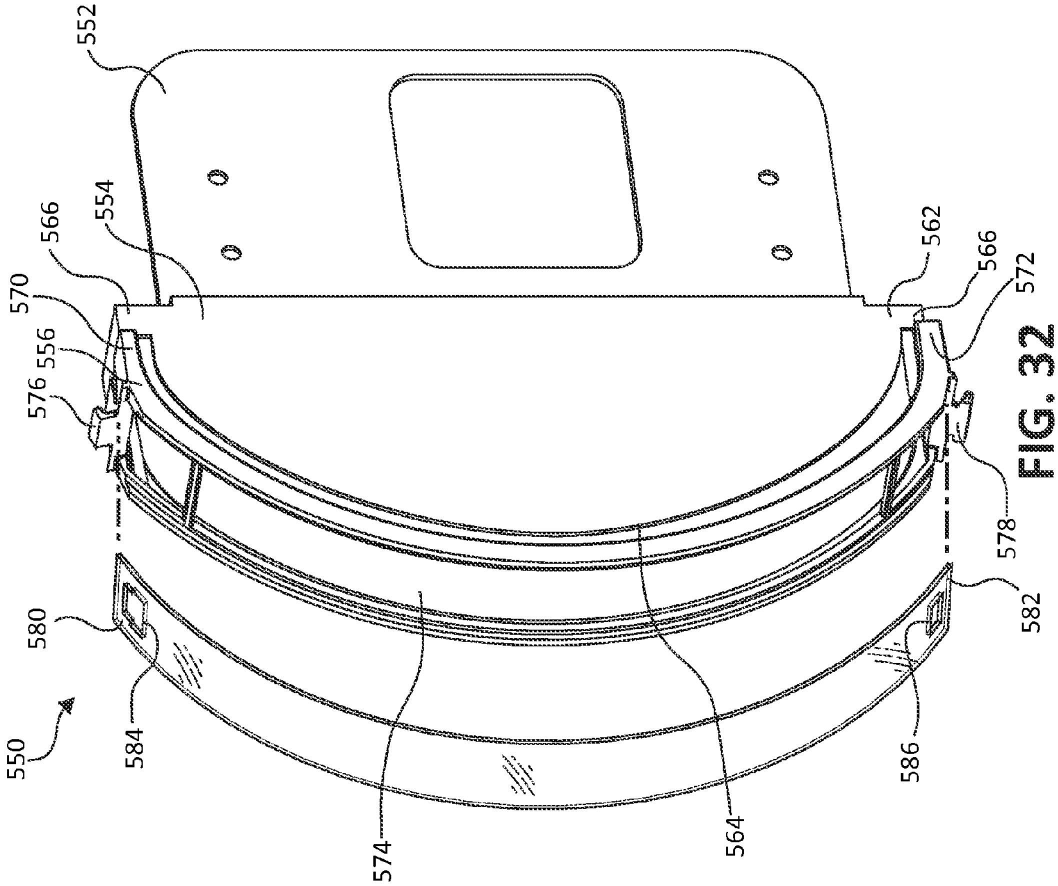
FIG. 32 is a partially exploded view illustration of the reel enhancement insert of FIG. 31.
Figure 31:
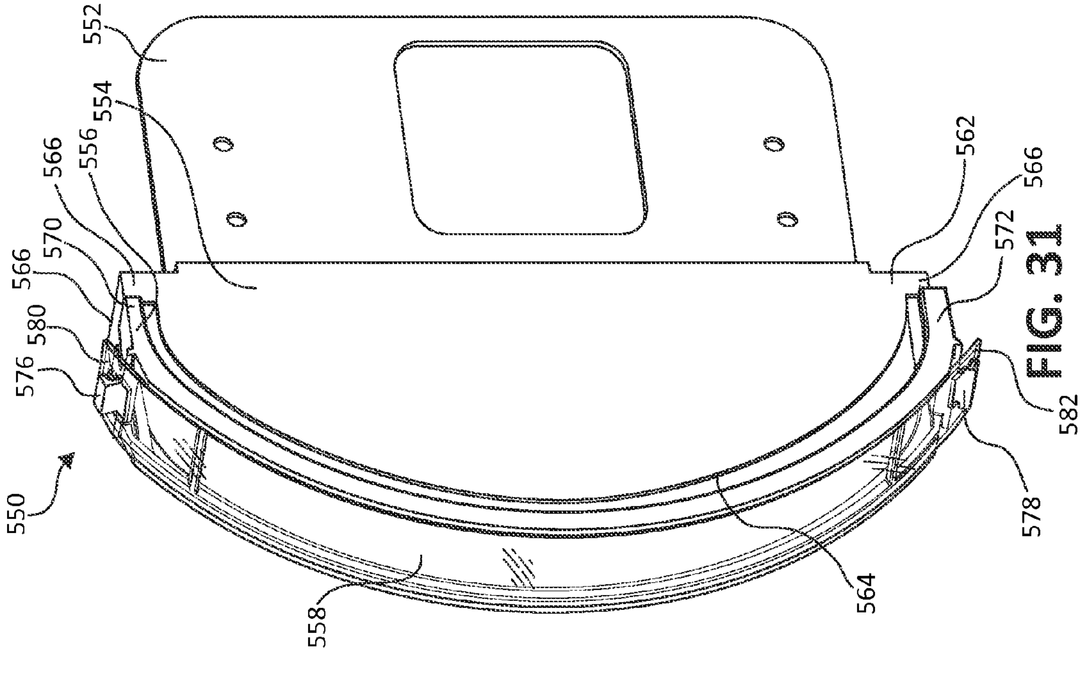
FIG. 31 is a perspective view illustration of a reel enhancement insert, according to one embodiment of the present invention.

FIGS. 31 and 32 illustrate an assembled and a partially assembled view of a reel partition 550, according to one embodiment of the present invention. The reel partition 550 includes a coupling plate 552, an extension panel 554, a support track 556, and a reel-enhancement insert 558, in one example. The coupling plate 552 is substantially planar and, during installation, is coupled with a substantially planar extension of an interior support structure (not shown) in the gaming machine via a mechanical fastener and/or other fastening agent such that the coupling plate 552 extends substantially vertically, in one example.

The extension plate 554 extends further forwardly from the coupling plate 552 either in plane with and/or offset from the coupling plate 552, with the later being illustrated in FIGS. 31 and 32. The extension plate 554 defines a rear edge 562 and a front edge 564. In one example, the extension plate 554 extends from the rear edge 562, which is adjacent the coupling plate 552, to the front edge 560, which is arched or otherwise curvilinear. In one embodiment, reel partition 550 includes a single extension plate 554 and reel partition 550 is open on an opposite side of the extension plate 554.

At either of the top and bottom sides of the front edge 560, track-coupling features 566 are formed and provide an offset extension from front edge 560. The support track 556 couples with each of the track-coupling features 566, for example, curving therebetween and spaced radially forwardly from the front edge 564.

The support track 556, more specifically, extends from a first end 570 to a second end 572, where each of the first end 570 and the second end 572 are adjacent and/or coupled to a different one of the track-coupling features 566. The support track 556 defines an elongated and/or arched window 574 extending along a substantially entirety of the support track 556, a first reception hook 576, and a second reception hook 578 at opposing ends thereof, for example, adjacent a respective one of a first end 570 and a second end 572 of the support track 556. Elongated window 574 farmed and front facing, and each of the first and second reception hooks 576 and 578 curves away from the elongated window 574 of the support track 556.

The insert 558 is elongated and one of substantially transparent or translucent and/or includes a light filter or graphic (not shown) printed, laminated, or otherwise added thereto. The insert 558 defines and extends between a first end 580 and a second end 582, for example, in an elongated rectangular shape. In one embodiment, the insert 558 additionally defines a first coupling aperture 584 near the first end 580 of the insert 558 and a second coupling aperture 586 near the second end 582 of the insert 558. Each of the first coupling aperture 584 and the second coupling aperture 586 are sized to selectively receive and be maintained by a corresponding one of the first reception hook 576 and the second reception hook 578 of the support track 556.

The reel partition 550 fits into a gaming machine, for one example, along sidelight section 512 of light assembly 474 provided in an opposite orientation as illustrated in FIGS. 28 and 29 such that the elongated window 574 and the reel-enhancement insert 558 extends generally in front of LEDs 520 providing a filter to lights from LEDs 520 viewed through the reel-enhancement insert 558. The reel partition 550 is secured in place via the coupling plate 552, which is coupled with corresponding structure (not shown) via screws, rivets, other fasteners, welding, etc. within a corresponding gaming machine. As such, all portions of the reel partition 550 extending in front of the coupling plate 552 generally cantilever from the coupling plate 552 with little or no additional support. Accordingly, reel partition 550 provides additional means for enhancing the overall aesthetic appeal of an associated gaming machine.

Figure 33:
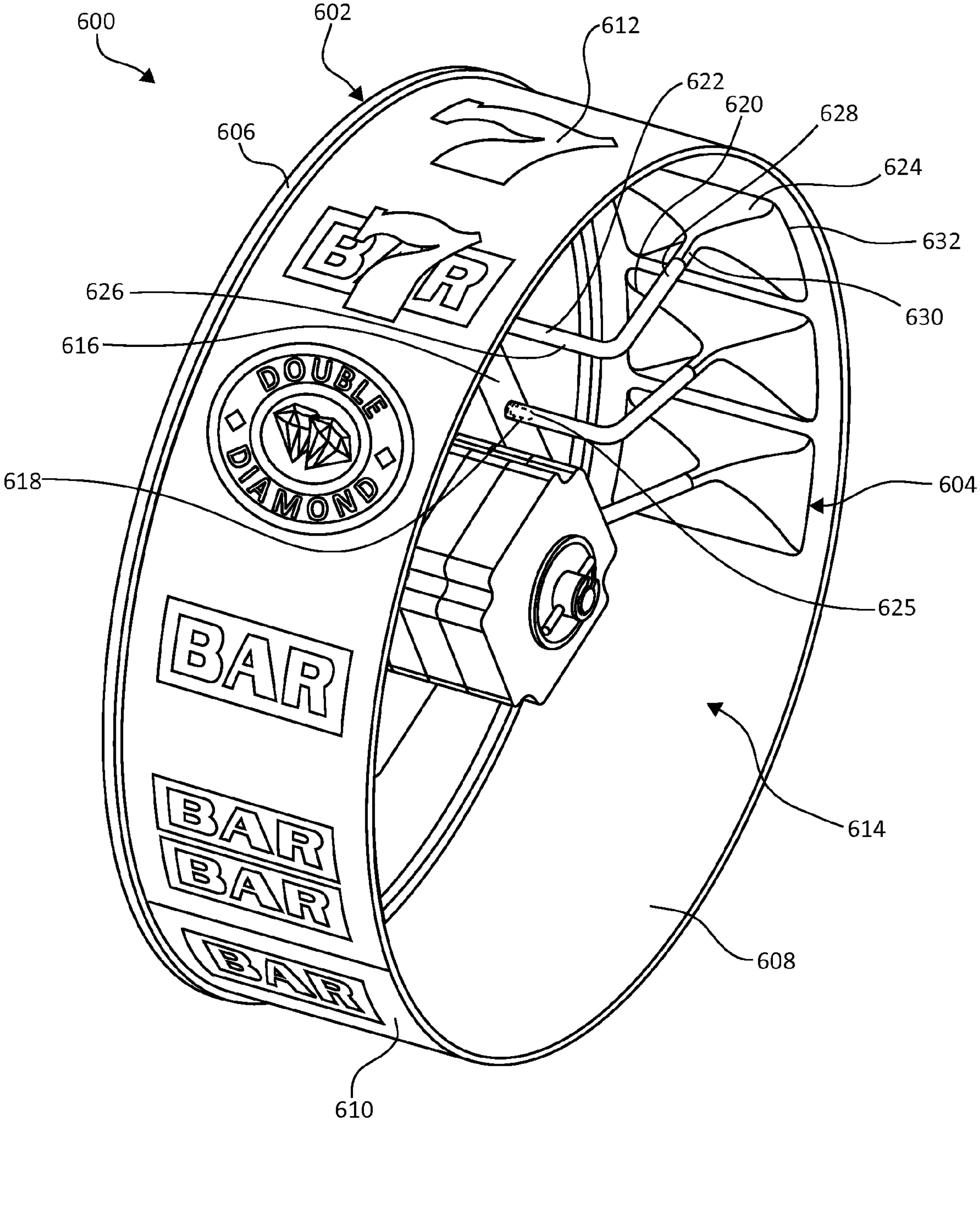
FIG. 33 is a perspective view illustration of a lighted reel assembly, according to one embodiment of the present invention.

FIG. 33 illustrates one embodiment of a lighted reel assembly 600 including a reel assembly 602 and a light assembly 604. The reel assembly 602 may take a variety of forms such as those examples described above. Generally speaking, the reel assembly 602 includes an outer ring 606, a support substrate 608, which is substantially identical to any of the support substrates 106, 152, 172, 196, 218, 240, 436, and 484 described above, with an optional reel strip 610, and an inner drive ring (not shown to better illustrate the light assembly 604). The support substrate 608 is formed as a cylinder with a cavity 614 being formed therethrough.

The light assembly 604 includes a printed circuit board (PCB) 616, light emitting diodes LEDs 618, and light directing apparatuses 620. The PCB 616 is substantially planar and rigid and includes the electrical connections for the light assembly 604 to be integrated with the electrical assemblies of a remainder of the gaming machine. Each of the LEDs 618 is mounted on and extends from one side of the PCB 616. In one example, the LEDs 618 each extend substantially perpendicularly to the PCB 616. A different one of the light directing apparatuses 620 is placed around each one of the LEDs 618.

According to one embodiment, each of the light directing apparatuses 620 includes a solid channel or solid pipe 622 and a dispersing section 624. The solid pipe 622 includes a small cavity 625 sized and shaped just large enough to receive a corresponding one of the LEDs 618, the small cavity 625 being located at one end of the solid pipe 622. The solid pipe 622 is formed a material having suitable properties to transmit light from the corresponding one of the LEDs 618 at the one end the solid pipe 622, through the solid pipe 622, and to the opposing end of the solid pipe 622. In one example, the solid pipe 622 is secured to the PCB 616 around the corresponding one of the LEDs 618. The solid pipe 622 includes a first length or segment 626 and a second length or segment 628. The first segment 626 of the solid pipe 622 extends from the PCB 616 in a direction substantially perpendicularly to the PCB 616 a distance substantially equal to half a lateral width of the support substrate 608. The solid pipe 622 bends at an end of the first segment 626 opposite the PCB 616 and continues as the second segment 628, for example, in a direction substantially perpendicular to the first segment 626.

The dispersing section 624 includes a tapered end 630 that is positioned adjacent to and extends from an end of the second segment 628 opposite the first segment 626. The dispersing section 624 extends radially outwardly from the tapered end 630 to an opposite perimeter edge 632. As the dispersing section 624 extends toward the opposite perimeter edge 632, the cross-sectional dimensions of the dispersing section 624 gradually increase. As such, the perimeter edge 632 of the dispersing section 624 is larger than the tapered end 630, for example, at least two about times larger, and in one instance, at least about five times larger. In one example, the dispersing section 624 is formed of a solid light transmitting material such as the same material forming the solid pipe 622, and terminates at the perimeter edge 632. In one example, each light directing apparatus 620 is formed as a single, solid piece of an optically transmissive material, such as acrylic or other suitable material, such that no boundaries or breaks are formed along the light directing apparatus 620 that could interrupt transmission of light from the corresponding LED 618. In one example, the overall area defined between the perimeter edge 632 is substantially equal to a portion of the support substrate 608 to a corresponding one of the gaming icons 612 disposed or affixed thereon. In one embodiment, the perimeter edge 632 is substantially rectangular.

The PCB 616 of the light assembly 604 is positioned in the gaming machine (not shown) to extend substantially perpendicularly to a rotational axis of the support substrate and, in one example, just outside the outer ring 606 of the reel assembly 602 thereof. Each of the LEDs 618 extends form the PCB 616 into the cavity 614. Accordingly, the first segment 626 of the solid pipe 622 extends into the cavity 614, for example, to a position substantially laterally centered relative to the support substrate 608. The second segment 626 extends radially relative to the reel assembly 602 toward a front side of the reel assembly 602 (the front side faces rearwardly in FIG. 33 for illustrative clarity) such that the perimeter edge 632 of the dispersing section 624 is positioned adjacent, but does not actually touch, the support substrate 608. The LEDs 618 are spaced on the PCB 616 such that the light assembly 604 similarly extends toward the support substrate 608 in a manner circumferentially stacking the corresponding perimeter edges 632 of the dispersing sections 624 along the inside surface of the support substrate 608 adjacent one another.

While three light directing apparatuses 620 are illustrated in FIG. 33, more or fewer light directing apparatuses 620 may be in included in the lighted reel assembly 600.

In one embodiment, each LED 618 corresponds with a different light directing apparatus 620 that is positioned to illuminate a different portion of the support substrate 608 and gaming icons 612 disposed thereon. In this manner, the lighted reel assembly 600 is able to illuminate individual ones of the gaming icons 612 and/or other portions of the reel strip 610 as desired for various games, game types, stage in a given game, etc. Since the light directing assemblies 604 can be fully assembled before insertion into a gaming machine, fewer electrical connections and positioning needs to be completed in the field, which in turn reduces the time and error rate in initial installation and or repair of the light assembly 604. In one example, each of the light directing apparatuses 620 is formed of a single piece of an optically obtuse material such that light entering into the light directing apparatuses 620 from the corresponding LEDs 618 generally only exits the light directing apparatuses 620 via the openings defined by perimeter edges 632 of the light directing apparatuses 620.

Figure 34:
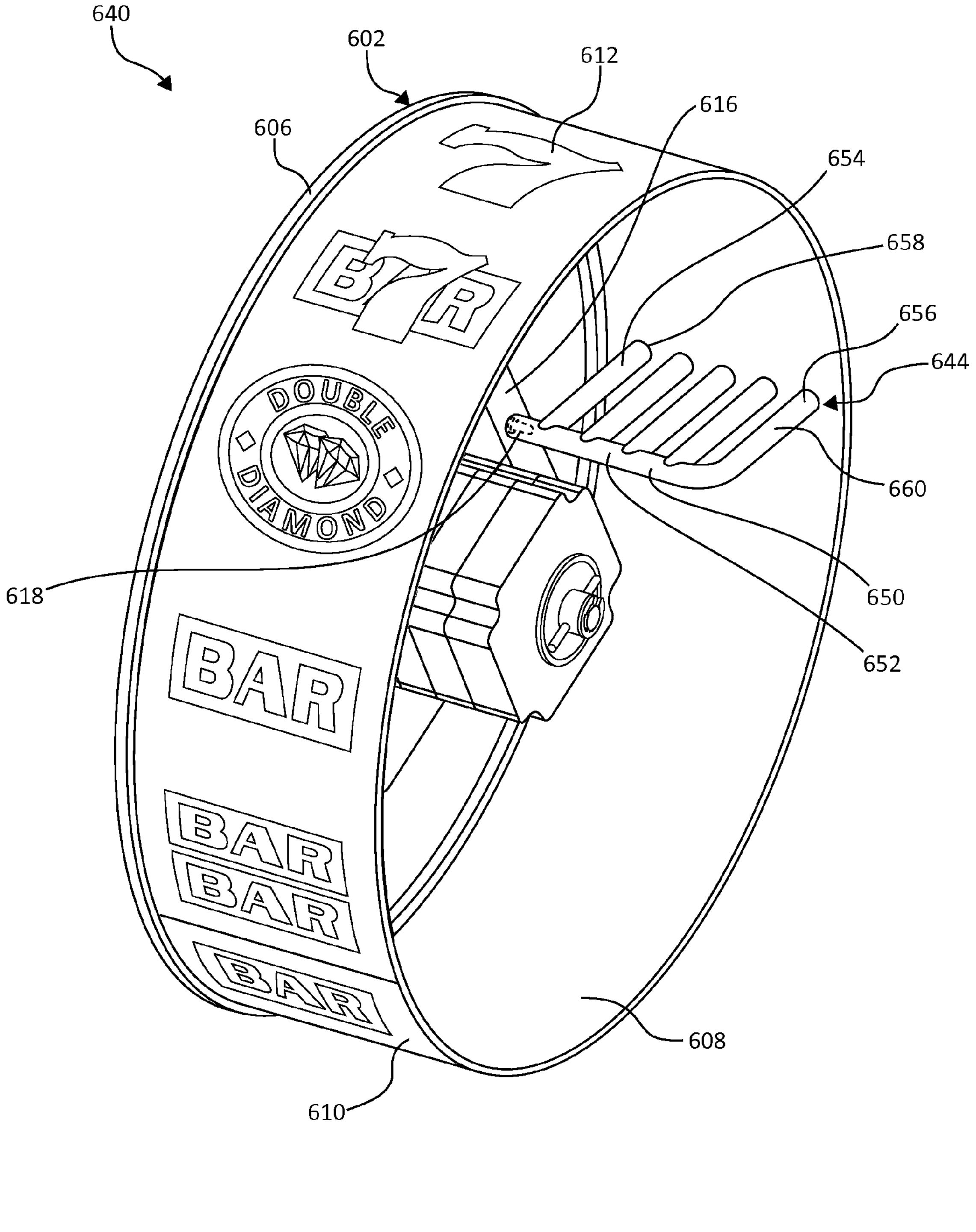
FIG. 34 is a perspective view illustration of a lighted reel assembly, according to one embodiment of the present invention.

FIG. 34 illustrates one embodiment of a lighted reel assembly 640 including the reel assembly 602, as described in detail with respect to FIG. 33, and a light assembly 644. The light assembly 644 includes the PCB 616 and LEDs 618 like the light assembly 604 of FIG. 33, but instead of light directing apparatuses 620, the light assembly 644 includes light directing apparatuses 650. A different one of the light directing apparatuses 650 is placed around each one of the LEDs 618. Only one light directing apparatus 650 is shown in FIG. 34 for illustrative purposes. However, in one example, the light assembly 644 includes a plurality of light directing apparatus 650, one for each LED 618 on PCB 616.

According to one embodiment, the light directing apparatus 650 includes a primary length of a solid channel or solid pipe 652 and one or more branch lengths of solid channel or solid pipe 654. At one end, the primary length of solid pipe 652 defines a small cavity 655 sized and shaped to receive a corresponding one of the LEDs 618 and, in one example, the solid pipe 652 is secured to the PCB 616 about the corresponding one of the LEDs. The primary length of solid pipe 652 extends from the LED 618 in a direction substantially perpendicularly to the PCB 616 a distance substantially equal to or slightly less than a lateral width of the support substrate 608. The primary length of solid pipe 652 bends at an end opposite the PCB 616 and continues in a direction substantially perpendicular to the initial extension of the primary length of solid pipe 652 to define an open and free end 656 opposite the corresponding one of LEDs 618 such that the primary length of solid pipe 652 substantially forms an L-shape, in one example. Light from the corresponding one of the LEDs 618 is substantially uniformly transmitted through the primary length of the solid pipe 652 to the branch lengths of solid pipe 654.

The branch lengths of solid pipe 654 extend from the initial extension of the primary length of solid pipe 652 with a substantially perpendicular orientation to branch free ends 658. In one embodiment, branch lengths of solid pipe 654 and primary length of solid pipe 652 are formed as a single piece and/or of the same material, such as an optically transmissive acrylic or other optically transmissive material. In one embodiment, light directing apparatus 650 is formed as a single, solid piece of material so as not to introduce any brakes or material boundaries that could interrupt the transmission of light from one of the LEDs 618 to the branch free ends 658. In one example, the branch lengths of solid pipe 654 are spaced from each other along the primary length of solid pipe 652 and/or extend away form the primary length of solid pipe 652 substantially parallel to one another and/or a portion of the primary length of solid pipe 652 adjacent the free end 656. Accordingly, light emitted from a corresponding LED 618 is directed through both the primary length of solid pipe 652 and the branch lengths of solid pipe 654. In this manner, the branch lengths of solid pipe 654 and the parallel portion of the primary length of solid pipe 652 collectively form a dispersing section 660 of the light assembly 644.

When the light assembly 644 is assembled with the reel assembly 602, the PCB 616 of the light assembly 644 is positioned in the gaming machine (not shown) to extend substantially perpendicular to a rotational axis of the support substrate 608 and, in one example, just outside the outer ring 606 of the reel assembly 602. Each of the LEDs 618 extends from the PCB 616 into the cavity 614. Accordingly, the primary length of solid pipe 652 extends into the cavity 614, for example, to a position substantially laterally corresponding to an opposing edge of the support substrate 608. The branch lengths of solid pipe 654 each extend toward a front side of the reel assembly 602 (the front side faces rearwardly in FIG. 34 for illustrative clarity) such that the free ends 656 and 658 of the dispersing section 660 are positioned adjacent, but do not actually touch, the inside surface of the support substrate 608. The LEDs 618 are spaced on the PCB 616 such that the different light assemblies 644 similarly extend toward the support substrate 608 in a manner circumferentially stacking the corresponding free ends 656 and 658 of the adjacent light assemblies 644 along the inside surface of the support substrate 608.

In one embodiment, as each LED 618 corresponds with a different light directing apparatus 620 that is positioned to illuminate a different portion of the support substrate 608 and gaming icons 612 disposed thereon, the lighted reel assembly 600 is able to illuminate individual ones of the gaming icons 612 and/or other portions of the reel strip 610 as desired for various games, game types, stage in a given game, etc. Since the light directing assemblies 644 can be fully assembled before insertion into a gaming machine fewer electrical connections need to be made and fewer items to be properly positioned in the field, which in turn reduces the time and error rate in initial installation and or repair of the light assembly 644. In one example, each of the light directing apparatuses 650 is formed of a single piece of an solid, optically transmissive material such that light entering into the light directly apparatuses 650 from the corresponding LEDs 618 is transmitted through the light directing apparatuses 650 and to the free ends 656 and 658 of the light directing apparatuses 650.

Although the invention has been described with respect to particular embodiments, such embodiments are meant for the purposes of illustrating examples only and should not be considered to limit the invention or the application and uses of the invention. Feature of the various embodiments may be used alone and or together with features of other described embodiments. For example, while a drive motor and/or encoder ring are only described in some of the embodiments, other described embodiments or implementations of the invention are also generally used with a drive motor and/or encoder ring. In addition, various alternatives, modifications, and changes will be apparent to those of ordinary skill in the art upon reading this application. Furthermore, there is no intention to be bound by any theory presented in the preceding background of the invention or the above detailed description.

What is claimed is:

1. A lighting assembly for a reel slot machine, the lighting assembly comprising:

an interface board being substantially planar, electrically couplable to the reel slot machine, and including a first electrical connection plug and a second electrical connection plug spaced from the first electrical connection plug; and a flexible printed circuit board defining a first end and a second end opposite the first end, wherein:

the first end of the flexible printed circuit board is electrically coupled to the first electrical connection plug, the second end of the flexible printed circuit board is electrically coupled to the second electrical connection plug, the flexible printed circuit board bows away from each of the first end and the second end to define a bowed primary face facing away from the interface board, the flexible printed circuit board further comprises a plurality of light sources coupled to the bowed primary face, and during use, the plurality of light sources selectively illuminate to provide lighting to a reel of the reel slot machine.

2. The lighting assembly of claim 1, wherein the flexible printed circuit board defines an elongated edge extending between the first end and the second end, the elongated edge extends from the bowed primary face to an opposite face of the flexible printed circuit board, and the elongated edge faces a primary surface of the interface board.

3. The lighting assembly of claim 2, wherein each of the first electrical connection plug and the second electrical connection plug extend from the primary surface of the interface board.

4. The lighting assembly of claim 1, wherein the interface board includes a machine interface plug for electrically interfacing with a remainder of the reel slot machine.

5. The lighting assembly of claim 1, wherein:

the flexible printed circuit board defines a reel section and a sidelight section, the reel section is positioned to a first side of the interface board, the sidelight section is positioned to a second side of the interface board, the second side of the interface board is opposite the first side of the interface board, and the plurality of light sources includes a first array of light sources extending across the reel section and a second array of light sources spaced away from the first array of light sources and extending across the sidelight section.

6. The lighting assembly of claim 5, wherein:

the second array of light sources includes at least two columns of the light sources, and each of the second array of light sources can be illuminated independently of other ones of the second array of light sources to create various illumination sequences.

7. The light assembly of claim 5, in combination with a reel assembly including an inner drive ring, an outer ring coaxially positioned relative to the inner drive ring, and a substrate extending between the inner drive ring and the outer ring, the substrate including a plurality of gaming icons, the reel section of the flexible printed circuit board fits substantially entirely within confines of the reel assembly, and the sidelight portion of the flexible printed circuit board extends outside the confines of the reel assembly.

8. The combination of claim 7, wherein the interface portion extends outside the confines of the reel assembly.

9. The light assembly of claim 5, in combination with a reel partition, the reel partition including:

an elongated insert that is one of substantially transparent and translucent extending over the sidelight section of the flexible printed circuit board, the elongated insert including a first coupling aperture near a first insert end of the elongated insert and a second coupling aperture near a second insert end of the elongated insert opposite the first insert end of the elongated insert, a first reception hook extending through the first coupling aperture of the elongated insert, and a second reception hook spaced from the first reception hook and extending through the second coupling aperture, wherein the first reception hook and the second reception hook interact with the elongated insert to selectively maintain the elongated insert in place over the sidelight section of the flexible printed circuit board.

10. The combination of claim 9, wherein:

the reel partition includes a framed and front-facing arched window having a first window end and a second window end, the first reception hook is positioned adjacent the first window end, and the second reception hook is positioned adjacent the second window end, and the elongated insert substantially entirely covers the framed and front-facing arched window.

11. The combination of claim 10, wherein:

the reel partition includes an extension board extending along a side of the sidelight section of the flexible interface board in a direction substantially parallel to the interface board, and the extension board terminates in a curvilinear front edge and the framed and front-facing arched window extends in front of the curvilinear front edge to cover the sidelight section of the flexible interface board.

12. The combination of claim 11, wherein a curvature of the curvilinear front edge is substantially identical to, but radially inset from, a curvature of the framed and front-facing arched window.

13. The lighting assembly of claim 1, in combination with a reel assembly including an inner drive ring, an outer ring coaxially positioned relative to the inner drive ring, and a substrate extending between the inner drive ring and the outer ring, the substrate including a plurality of gaming icons, wherein at least a portion of the flexible printed circuit board fits within confines of the reel assembly such that at least a portion of the plurality of light sources selectively illuminates at least a portion of the substrate including the gaming icons.

14. The combination of claim 13, wherein:

the inner drive ring includes a central hub, an annular rim concentrically extending around the central hub, and spokes extending between the central hub and the annular rim, each of the spokes is twisted between the central hub and the annular rim to one of draw air into and push air out of the confines of the reel assembly when the reel assembly is rotated to cool the light assembly.

15. The combination of claim 14, wherein each of the spokes is twisted to gradually open to an outside of the reel assembly opposite the interface board as it extends from the central hub to the annular rim.

16. An enhanced reel assembly for a mechanical reel slot machine, the enhanced reel assembly comprising:

a reel assembly including a cylindrically shaped substrate defining a circumference and supporting a plurality of gaming icons spaced around the circumference, wherein a cavity is formed within the cylindrically shaped substrate; and a light assembly including:

an interface board positioned outside the cavity, wherein the interface board is elongated and substantially planar, the interface board defining opposing ends, and a flexible printed circuit board coupled to the interface board near each of the opposing ends of the interface board and bowing forwardly from the interface board, wherein the flexible printed circuit board includes a plurality of light sources on an outwardly facing surface thereof, the flexible printed circuit board is positioned at least partially within the cavity such that the plurality of light sources are positioned to provide back lighting to a portion of the cylindrically shaped substrate, and the plurality of light sources are configured to be illuminated in varying sequences to illuminate different ones of the gaming icons differently during play of the mechanical reel slot machine.

17. The enhanced reel assembly of claim 16, wherein the outwardly facing surface of the flexible printed circuit board is substantially continuous between opposing ends of the flexible printed circuit board.

18. The enhanced reel assembly of claim 16, wherein a side edge of the flexible printed circuit board is positioned adjacent a primary, substantially planar surface of the interface board at each of two opposing ends of the flexible printed circuit board.

19. The enhanced reel assembly of claim 16, wherein:

an opening is defined between the flexible printed circuit board and the interface board, the reel assembly includes a central hub coaxially positioned with the cylindrically shaped substrate, and the enhanced reel assembly further comprises a drive motor extending through the opening to couple with the central hub, wherein the drive motor selectively controls rotation of the reel assembly within the mechanical reel slot machine.

20. The enhanced reel assembly of claim 16, wherein the flexible printed circuit board defines a reel section and a sidelight section, the reel section is positioned to a first side of the interface board within the cavity, the sidelight section is positioned to a second side of the interface board outside the cavity, the second side of the interface board is opposite the first side of the interface board, and the plurality of light sources includes a first array of light sources extending across the reel section and a second array of light sources spaced away from the first array of light sources and extending across the sidelight section such that the first array of light sources illuminates the cylindrically shaped substrate, and the second array of light sources provides side lighting adjacent the reel assembly.

21. The enhanced reel assembly of claim 20, in combination with a reel partition, the reel partition including:

an elongated insert that is one of substantially transparent and translucent extending over the sidelight section of the flexible printed circuit board, the elongated insert including a first coupling aperture near a first insert end of the elongated insert and a second coupling aperture near a second insert end of the elongated insert opposite the first insert end of the elongated insert, a first reception hook extending through the first coupling aperture of the elongated insert, and a second reception hook spaced from the first reception hook and extending through the second coupling aperture, wherein the first reception hook and the second reception hook interact with the elongated insert to selectively maintain the elongated insert in place over the sidelight section of the flexible printed circuit board.

22. The enhanced reel assembly of claim 16, wherein:

the reel assembly further comprises a central hub coaxial with the cylindrically shaped substrate, an annular rim circumferentially coupled with a side edge of the cylindrically shaped substrate, and spokes extending between the central hub and the annular rim, and each of the spokes is twisted between the central hub and the annular rim to one of draw air into and push air out of the confines of the reel assembly when the reel assembly is rotated to cool the light assembly.

23. A method of lighting a reel assembly within a mechanical reel gaming machine, where the reel assembly includes a cylindrical substrate supporting a plurality of gaming icons and a central hub coupled to the cylindrical substrate and coaxially positioned relative to the cylindrical substrate, the method comprising:

providing a light assembly comprising an interface board and a flexible circuit board, wherein the flexible circuit board is in electrical communication with a remainder of the mechanical reel gaming machine only via the interface board, the flexible circuit board includes two opposing ends coupled to the interface board, and the flexible circuit board curves from each of the two opposing ends to define an opening between the flexible circuit board and the interface board;

positioning at least a portion of the flexible circuit board within the cylindrical substrate such that a plurality of rows of lights are mounted to an outer curved surface of the flexible circuit board face the cylindrical substrate, wherein the interface board is maintained adjacent to but not within the cylindrical substrate; and selectively illuminating light sources in the plurality of rows of lights to selectively illuminate different portions of the cylindrical substrate during play of the mechanical reel gaming machine.

24. The method of claim 23, wherein:

a drive motor extends through the opening between the flexible circuit board and the interface board to couple with the central hub and drive rotation of the reel assembly, and selectively illuminating the light sources emphasizes the selective rotation of the reel assembly.

25. The method of claim 23, wherein:

the flexible circuit board comprises a substantially continuous and arched sidelight portion extending outside an edge of the cylindrical substrate, a sidelight plurality of lights are supported on the substantially continuous and arched sidelight portion outside confines of the reel assembly, and the method further comprises selectively illuminating ones of the sidelight plurality of lights.

26. The method of claim 25, wherein:

an arched window insert is selectively coupled to extend over the sidelight plurality of lights adjacent the reel assembly, and selectively illuminating ones of the sidelight plurality of lights provides selective illumination to the arched window insert.

27. The method of claim 23, wherein:

the reel assembly includes an annular rim and spokes, the annular rim is circumferentially coupled with an edge of the cylindrical substrate, the spokes of the reel assembly are twisted as they extend between the central hub and the annular rim, and the method further comprises cooling the light assembly via rotation of the reel assembly such that interaction between the spokes and surrounding air one of draws air into and pushes air out of the confines of the reel assembly adjacent the light assembly.

* * * * *